(12) United States Patent
Makino

(10) Patent No.: US 6,917,352 B2
(45) Date of Patent: Jul. 12, 2005

(54) OPTICAL SWITCHING ELEMENT, AND SWITCHING DEVICE AND IMAGE DISPLAY APPARATUS EACH USING THE OPTICAL SWITCHING ELEMENT

(75) Inventor: Takuya Makino, Chiba (JP)

(73) Assignee: Sony Corporation (JP)

( * ) Notice: Subject to any disclaimer, the term of this patent is extended or adjusted under 35 U.S.C. 154(b) by 738 days.

(21) Appl. No.: 09/881,850

(22) Filed: Jun. 18, 2001

(65) Prior Publication Data

US 2002/0024483 A1 Feb. 28, 2002

(30) Foreign Application Priority Data

Jun. 19, 2000 (JP) ..................................... P2000-183439

(51) Int. Cl.[7] ................................................ G09G 3/34
(52) U.S. Cl. ........................... 345/84; 345/85; 345/108; 385/18; 359/223
(58) Field of Search .............................. 345/84, 85, 86, 345/108; 348/770, 771, 772; 385/18, 32; 359/209, 223, 224

(56) References Cited

U.S. PATENT DOCUMENTS

| | | | | |
|---|---|---|---|---|
| 5,579,149 A | * | 11/1996 | Moret et al. | 359/223 |
| 5,600,383 A | * | 2/1997 | Hornbeck | 348/771 |
| 5,696,619 A | * | 12/1997 | Knipe et al. | 359/224 |
| 5,841,579 A | | 11/1998 | Bloom et al. | |
| 6,470,115 B1 | * | 10/2002 | Yonekubo | 385/32 |
| 6,549,694 B2 | * | 4/2003 | Makino et al. | 385/18 |
| 6,608,621 B2 | * | 8/2003 | Mochizuki | 345/204 |
| 6,611,377 B1 | * | 8/2003 | Chung | 359/572 |
| 6,642,913 B1 | * | 11/2003 | Kimura et al. | 345/84 |

FOREIGN PATENT DOCUMENTS

JP 10-510374 10/1998

* cited by examiner

*Primary Examiner*—Xiao Wu
(74) *Attorney, Agent, or Firm*—Rader, Fishman & Grauer PLLC; Ronald P. Kananen

(57) ABSTRACT

An optical switching element having a simple configuration and high response and capable of performing gradation display by area gradation is provided. In a state where a light extracting portion is in contact with an upper substrate, light enters the light extracting portion from the upper substrate, emits from the back face of the light extracting portion, is passed through a lower substrate, and becomes transmission light. In a state where the light extracting portion is attracted by the lower substrate side, the incident light is totally reflected by a total reflection face, and total reflection light emits from a V-shaped groove. The incident light can be switched in two directions and obtained as the transmission light and the total reflection light. To display one pixel, in the light extracting portion and a plurality of other light extracting portions, the incident light is selectively taken by being switched between two directions of the transmission light and the total reflection light, thereby enabling the gradation display by area gradation to be performed.

5 Claims, 20 Drawing Sheets

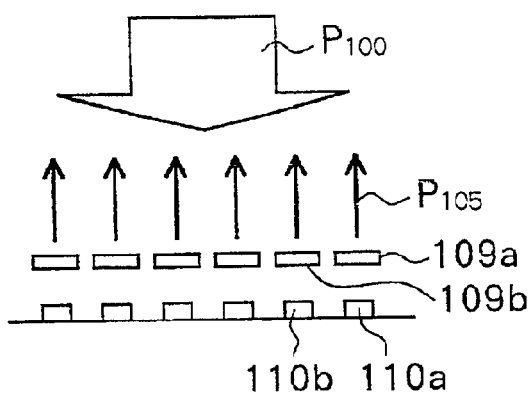
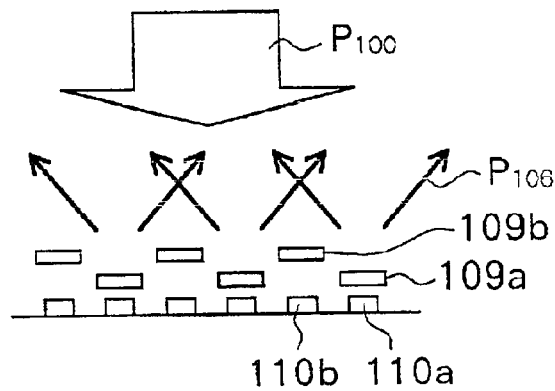
FIG.6A
RELATED ART
FIG.6B
RELATED ART

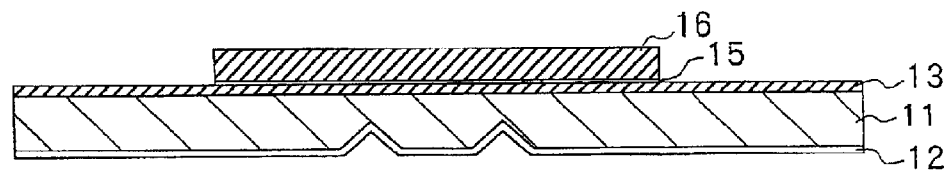
FIG.10
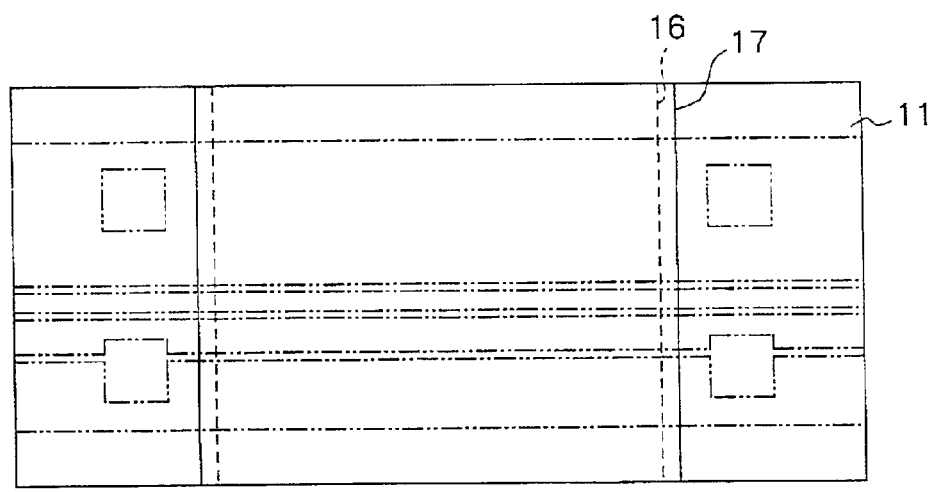
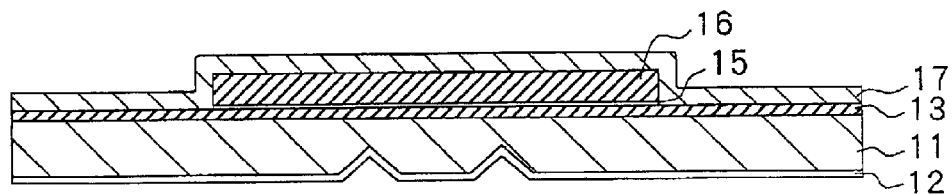
FIG.11A
FIG.11B

| Area \ Time | 1 | 2 | 3 | 4 | 5 | 6 | 7 | 8 | 9 | 10 | 11 | 12 | 13 | 14 | 15 | 16 | Gradation number |
|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 16 |
| 2 | 2 | 4 | 6 | 8 | 10 | 12 | 14 | 16 | 18 | 20 | 22 | 24 | 26 | 28 | 30 | 32 | 8 |
| 3 | 3 | 6 | 9 | 12 | 15 | 18 | 21 | 24 | 27 | 30 | 33 | 36 | 39 | 42 | 45 | 48 | 8 |
| 4 | 4 | 8 | 12 | 16 | 20 | 24 | 28 | 32 | 36 | 40 | 44 | 48 | 52 | 56 | 60 | 64 | 6 |
| 5 | 5 | 10 | 15 | 20 | 25 | 30 | 35 | 40 | 45 | 50 | 55 | 60 | 65 | 70 | 75 | 80 | 8 |
| 6 | 6 | 12 | 18 | 24 | 30 | 36 | 42 | 48 | 54 | 60 | 66 | 72 | 78 | 84 | 90 | 96 | 7 |
| 7 | 7 | 14 | 21 | 28 | 35 | 42 | 49 | 56 | 63 | 70 | 77 | 84 | 91 | 98 | 105 | 112 | 8 |
| 8 | 8 | 16 | 24 | 32 | 40 | 48 | 56 | 64 | 72 | 80 | 88 | 96 | 104 | 112 | 120 | 128 | 4 |
| 9 | 9 | 18 | 27 | 36 | 45 | 54 | 63 | 72 | 81 | 90 | 99 | 108 | 117 | 126 | 135 | 144 | 8 |
| 10 | 10 | 20 | 30 | 40 | 50 | 60 | 70 | 80 | 90 | 100 | 110 | 120 | 130 | 140 | 150 | 160 | 6 |
| 11 | 11 | 22 | 33 | 44 | 55 | 66 | 77 | 88 | 99 | 110 | 121 | 132 | 143 | 154 | 165 | 176 | 6 |
| 12 | 12 | 24 | 36 | 48 | 60 | 72 | 84 | 96 | 108 | 120 | 132 | 144 | 156 | 168 | 180 | 192 | 4 |
| 13 | 13 | 26 | 39 | 52 | 65 | 78 | 91 | 104 | 117 | 130 | 143 | 156 | 169 | 182 | 195 | 208 | 4 |
| 14 | 14 | 28 | 42 | 56 | 70 | 84 | 98 | 112 | 126 | 140 | 154 | 168 | 182 | 196 | 210 | 224 | 3 |
| 15 | 15 | 30 | 45 | 60 | 75 | 90 | 105 | 120 | 135 | 150 | 165 | 180 | 195 | 210 | 225 | 240 | 2 |
| 16 | 0 | 0 | 0 | 0 | 0 | 0 | 0 | 0 | 0 | 0 | 0 | 0 | 0 | 0 | 0 | 0 | 1 |
| Area | | | | | | | | | | | | | | | | Total | 99 |

FIG.22

OPTICAL SWITCHING ELEMENT, AND SWITCHING DEVICE AND IMAGE DISPLAY APPARATUS EACH USING THE OPTICAL SWITCHING ELEMENT

BACKGROUND OF THE INVENTION

1. Field of the Invention

The present invention relates to an optical switching element capable of polarizing incident light into two directions, and an optical switching device and an image display apparatus each using the optical switching element.

2. Description of the Related Art

In recent years, importance of a display as a display device of image information is increasing. As an element for the display and, further, as elements for optical communication, an optical memory device, an optical printer, and the like, development of an optical switching element operating at high speed is in demand. Conventionally, elements of this kind include an element using a liquid crystal, an element using a micromirror, an element using a diffraction grating, and the like. FIG. 1 shows an example of the element using a liquid crystal. FIGS. 2A and 2B to FIG. 5 show examples of the elements using micromirrors. FIGS. 6A and 6B show an example of the element using a diffraction grating.

An optical switching element using a liquid crystal (FIG. 1) includes two polarizing plates 101a and 101b, two glass substrates 102a and 102b, transparent electrodes 103a, 103b, 103c, and 103d, and a liquid crystal 104 sealed between the glass substrates 102a and 102b. The optical switching element performs switching operation by applying a voltage across the transparent electrodes 103a, 103b, 103c, and 103d to control the directions of liquid crystal molecules, thereby rotating a plane of polarization.

The liquid crystal has, however, response of only about a few milliseconds at the highest and therefore has a problem such that the liquid crystal has a characteristic of low response. Consequently, it is very difficult to apply the liquid crystal to optical communication, optical calculation, optical memory device such as a hologram memory, optical printer, and the like requiring fast response. Since the optical switching element using the liquid crystal needs two polarizing plates, there is also a problem that efficiency of light utilization decreases. Further, since the liquid crystal is not resistive to strong light, light having high energy density such as a strong laser beam cannot be switched. Particularly, in the case of using the optical switching element for a display, higher image quality as compared with that of optical switching elements of recent years is requested. The optical switching element using the liquid crystal of current conditions starts to be insufficient with respect to accuracy in gradation display.

As for the optical switching element using a micromirror, there are already a number of examples typified by the DMD (Digital Micromirror Device) of Texas Instruments Incorporated (U.S.). The examples of the DMD can be broadly divided into two kinds with respect to the structure; a structure in which a micromirror is supported by one side (FIGS. 2A and 2B and FIG. 3) and a structure in which a micromirror is supported by both sides (FIGS. 4A and 4B and FIG. 5). Micromirror driving methods include a method using electrostatic attraction, a method using a piezoelectric device, and a method using a thermal actuator. In spite of difference in structure, driving method, and the like, the function of switching incident light by controlling the angle of a micromirror is a very simple one.

A micromirror of a type using electrostatic attraction will be described here as an example. The driving principle of the micromirror is as follows. In the case where a micromirror 105 is supported by one side (FIGS. 2A and 2B and FIG. 3), by giving a potential difference between the micromirror 105 and a drive electrode 106, the electrostatic attraction is generated to make the micromirror 105 tilt. When the given potential difference is eliminated, the micromirror 105 returns to its original state by spring force of a hinge 105a supporting the micromirror 105.

In the case where the micromirror is supported by both sides (FIGS. 4A and 4B and FIG. 5), the same potential difference is created between a micromirror 108 and two electrodes 107a and 107b facing the micromirror 108. From such a state, for example, by decreasing a voltage applied to one, 107a, of the electrodes and increasing a voltage applied to the other electrode 107b, unbalance is caused between the electrostatic attraction generated between the electrode 107a and the micromirror 108 and the electrostatic attraction generated between the electrode 107b and the micromirror 108, thereby making the micromirror 108 tilt.

Light is switched as follows. In the case of the micromirror supported by one side (FIGS. 2A and 2B and 3), in a state where the micromirror 105 is not tilted with respect to incident light $P_{100}$, reflection light travels in a direction $P_{101}$. In a state where the micromirror 105 tilts with respect to the incident light $P_{100}$, reflection light travels in a direction $P_{102}$. In the case of the micromirror supported by both sides (FIGS. 4A and 4B and FIG. 5), similarly, in a state where the micromirror 108 tilts in one direction with respect to incident light $P_{100}$, reflection light travels in a direction $P_{103}$. In a state where the micromirror 108 tilts in another direction with respect to the incident light $P_{100}$, reflection light travels in a direction $P_{104}$.

The response is, however, about a few microseconds in many cases. It cannot be said the speed is high enough. In order to perform gradation display by a digital control using time division, one micromirror is necessary per pixel in an image, that is, a two-dimensional micromirror array is necessary. It is considered that the demand on the higher image quality is increasing more and more. In this case, manufacturing of a necessary two-dimensional micromirror array will become very difficult. In an optical switching element using the micromirrors, a light polarizable angle (angle difference between two reflection light) is about twice as large as a mechanical mirror runout angle. However, in the case of using the optical switching element for a display, to make the contrast high, the angle difference between the two reflection light $P_{103}$ and $P_{104}$ has to be set large. It causes a problem that the response deteriorates more.

In the optical switching device using a diffraction grating (FIGS. 6A and 6B), as disclosed in Translated National Publication of Patent Application No. Hei10-510374, a ribbon-shaped movable mirror 109a is moved by a quarter of the wavelength of the incident light $P_{100}$ by electrostatic attraction generated by making a potential difference between the movable mirror 109a and a lower electrode 110a, so that an optical path difference corresponding to the half of the wavelength is caused between a ribbon-shaped stationary mirror 109b and the movable mirror 109a, thereby generating diffraction light. The reflection light is switched between the direction of zero-order diffraction light $P_{105}$ and the direction of primary diffraction light $P_{106}$. In this case, by controlling the optical path difference within the range to the half wave, the intensity of the primary diffraction light $P_{106}$ can be controlled. In an optical switching device using a diffraction grating, only by moving a very light ribbon-shaped mirror by a short distance, light can be switched. Consequently, the optical switching device has fast response (about tens nanoseconds) and is suitable for high-speed switching.

The primary diffraction light is, however, generated with certain angles in two directions symmetrical to the optical axis of the zero-order diffraction light. Consequently, in order to use the primary diffraction light, a complicated optical system for collecting light traveling in the two directions to a single light is necessary. To make the light diffract, at least two ribbon-shaped mirrors are necessary per pixel. In order to increase the efficiency of light utilization, four or more, actually, six ribbon-shaped mirrors are necessary. In a light valve (spatial light modulator) in which a necessary number of pixels of the ribbon-shaped mirrors six per pixel are formed in an array, it is desired that a reflection face of the stationary mirror 109*b* and a reflection face of the movable mirror 109*a* are flush with each other to avoid generation of the primary diffraction light without applying voltage to the electrodes. In practice, however, the reflection faces are not easily adjusted to be flush with each other. Fine adjustment is therefore necessary to make all of the reflection faces flush with each other by applying a low voltage to each of lower electrodes 110*a* and 110*b*.

SUMMARY OF THE INVENTION

The invention has been achieved in view of the problems. A first object of the invention is to provide a small, light optical switching element having a simple structure and high response, and capable of performing gradation display by area gradation in an image display apparatus and an optical switching device using the optical switching element.

A second object of the invention is to provide an image display capable of performing gradation display of ultra-high precision by using the optical switching element and obtaining high image quality.

An optical switching element according to the invention comprises: a total reflection member having a total reflection face by which incident light can be totally reflected; and a plurality of translucent light extracting portions constructing one pixel, each of which can be switched between a first position at which the light extracting portion comes into contact with or is close to the total reflection face of the total reflection member in a distance in which near field light can be extracted and a second position apart from the total reflection face by more than the distance in which the near field light can be extracted.

An optical switching device according to the invention has a plurality of optical switching elements according to the invention which are arranged one-dimensionally or two-dimensionally.

An image display according to the invention having a plurality of optical switching elements according to the invention arranged displays a two-dimensional image by irradiating the plurality of optical switching elements with light of three primary colors and scanning light by a scanner.

In the optical switching element, optical switching device, and image display according to the invention, when the light extracting portion is in the second position, the total reflection member and the translucent light extracting portion are apart from each other. Consequently, incident light on the total reflection member is totally reflected by the total reflection face, and its reflection light is led in one direction. When the light extracting portion is in the first position, the total reflection member and the light extracting portion are in contact with each other or are close to each other. Consequently, incident light on the total reflection member is not totally reflected but is led to another direction opposite to the total reflection member via the light extracting portion. Thus, by selectively switching each of the light extracting portions between the first and second positions with respect to one pixel, gradation display by area gradation can be performed. The expression "to be close to the total reflection face in a distance in which near field light can be extracted" denotes that the light extracting portion does not have to be in perfect contact with the total reflection member but is sufficient that the light extracting portion is in a distance so that incident light can be extracted. When the light extracting portion is close to the total reflection member in a distance of about $\frac{1}{40}$ of the wavelength ($\lambda$) of incident light, 90% or more of incident light can be extracted.

Other and further objects, features and advantages of the invention will appear more fully from the following description.

BRIEF DESCRIPTION OF THE DRAWINGS

FIGS. 6A and 6B are views for explaining an action of a conventional optical switching element using a diffraction grating.

FIG. 10 is a cross section for explaining a process following the process of FIG. 9.

FIGS. 11A and 11B are plan view and cross section for explaining a process following the process of FIG. 10.

FIG. 22 is an explanatory diagram showing an example of a method of gradation display combining area gradation display and gradation display by time division per pixel in the optical switching device shown in FIG. 7.

BRIEF DESCRIPTION OF THE PREFERRED EMBODIMENTS

Embodiments of the invention will be described in detail hereinbelow with reference to the drawings.

Figure 1:
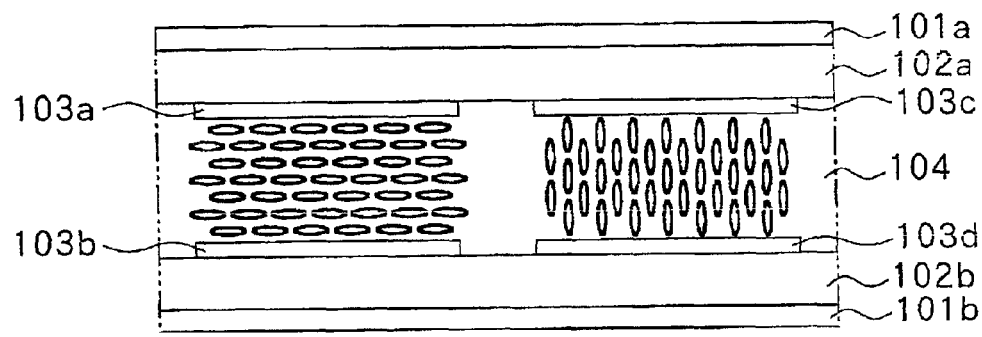
FIG. 1 is a view showing a structure of a conventional optical switching element using liquid crystal.
Figure 2A:
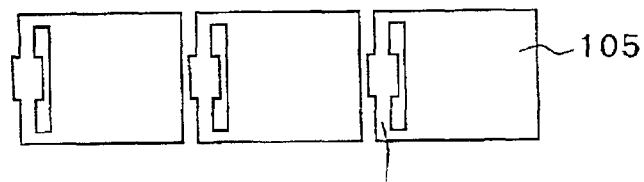
FIGS. 2A and 2B are views showing structure of a conventional optical switching element using a micromirror (of one-side support type).
Figure 2B:
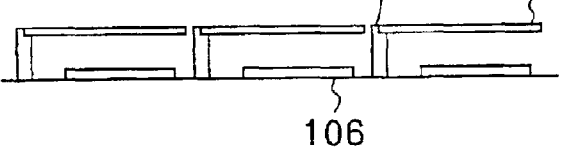
Figure 3:
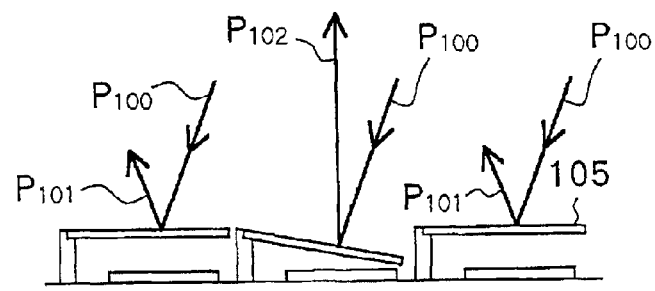
FIG. 3 is a view for explaining an action of the optical switching element of FIGS. 2A and 2B.
Figure 4A:
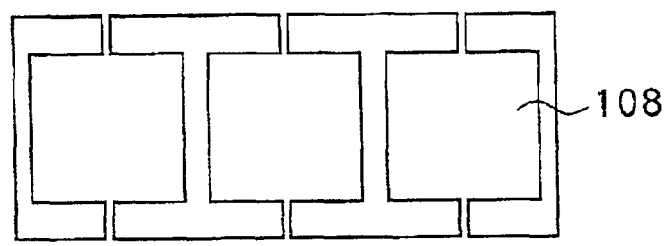
FIGS. 4A and 4B are views showing a structure of a conventional optical switching element using a micromirror (of both-side support type).
Figure 4B:
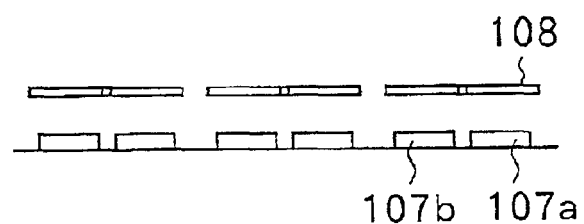
Figure 5:
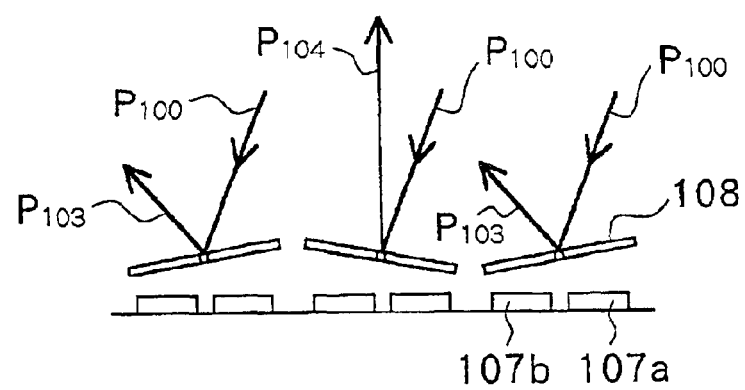
FIG. 5 is a view for explaining an action of the optical switching element of FIGS. 4A and 4B.
Figure 7:
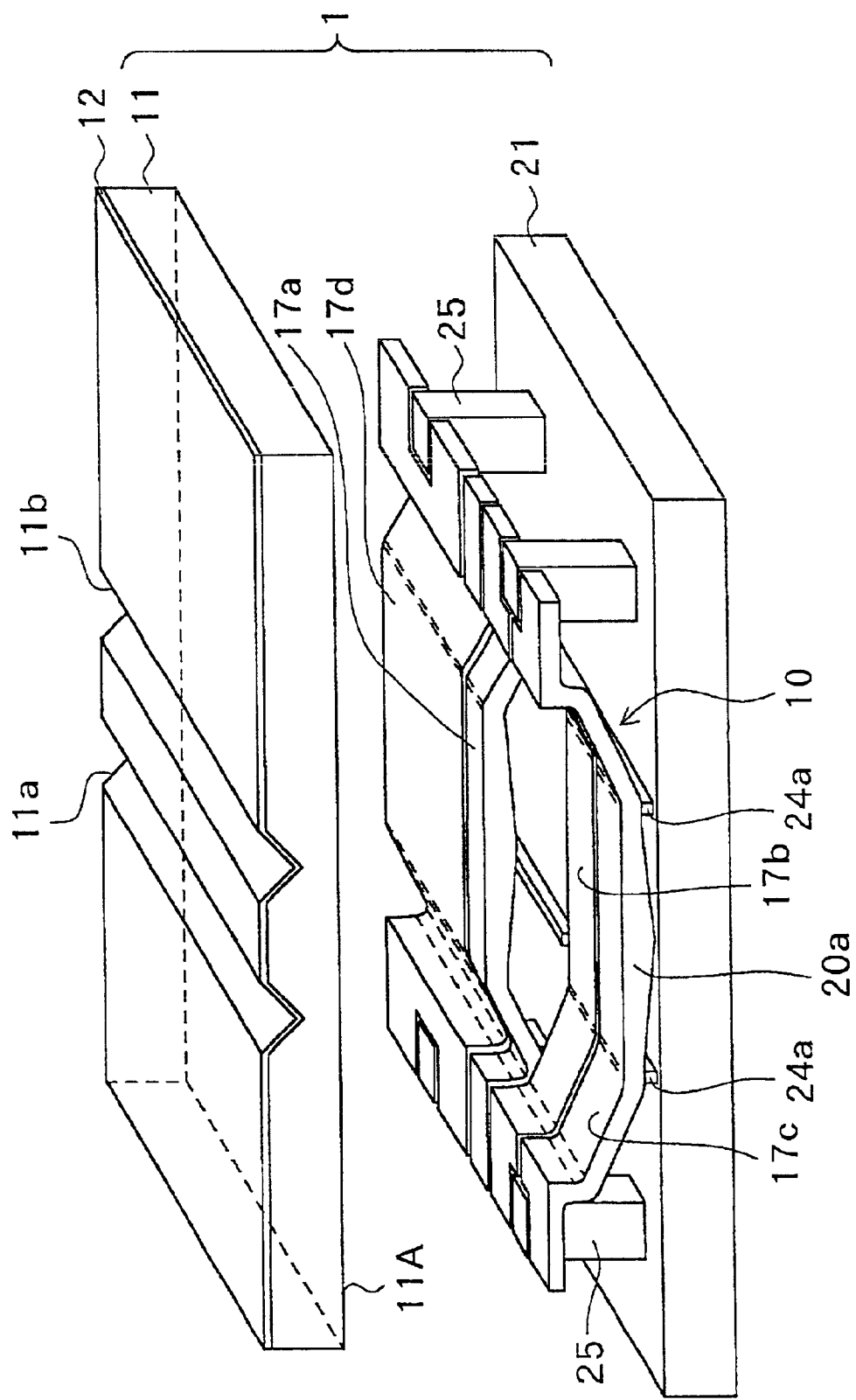
FIG. 7 is a perspective view showing the configuration of an optical switching device according to an embodiment of the invention.

FIG. 7 shows a partial configuration of an optical switching device 1 according to an embodiment of the invention. In FIG. 7, although the optical switching device 1 having an optical switching element 10 a corresponding to one pixel is expressed for simplicity, the optical switching device 1 of the invention has a one-dimensional array structure having a plurality of optical switching elements 10. By the optical switching device 1, for example, an image display which will be described herein later is constructed.

The optical switching device 1 has a translucent upper substrate 11 and a translucent lower substrate 21 disposed so as to face the upper substrate 11. Each of the upper substrate 11 and the lower substrate 21 is a translucent substrate which is, for example, a glass substrate or a transparent plastic substrate.

The top face and the under face of the upper substrate 11 are parallel to each other. In the top face, a V-shaped groove 11a as a light incident portion and a V-shaped groove 11b as a light emitting portion are formed. On the top face including the V-shaped grooves 11a and 11b, an anti reflection film 12 made of, for example, MgF$_2$ (magnesium fluoride) is formed. The under face of the upper substrate 11 is a total reflection face 11A for totally reflecting incident light. The angle of inclination of each of the V-shaped grooves 11a and 11b is an angle equal to or larger than a critical angle for totally reflecting light entering from a direction perpendicular to the inclined face by the total reflection face 11A.

On the total reflection face 11A side of the upper substrate 11, although not shown, an upper transparent electrode made of, for example, ITO (Indium-Tin Oxide; a mixed film of indium-tin oxide) is formed. On the total reflection face 11A side of the upper substrate 11, for example, four thin ribbon-shaped light extracting portions 17a, 17b, 17c, and 17d made of silicon nitride (SiNx) are disposed. The ratio of widths (areas) of the light extracting portions 17a, 17b, 17c, and 17d is desirably $2^n$ (where n is an integer of 0 or larger) and is, for example, 1:2:4:8. In the embodiment, one pixel in an image display is constructed by the four light extracting portions 17a to 17d. The light extracting portions 17a to 17d are shown by being separated from the upper substrate 11 to make the structure understood easier in FIG. 7.

Each of the light extracting portions 17a, 17b, 17c, and 17d has a bridge structure including both ends supported by the upper substrate 11 and an intermediate portion which is switchable between a first position and a second position. In the first position, by electrostatic attraction generated by a potential difference due to application of a voltage to the transparent electrode, the intermediate portion is in contact with the total reflection face 11A of the upper substrate 11 or is close to the total reflection face 11A within a distance in which near field light can be extracted (state of the light extracting portions 17a and 17d in FIG. 7). In the second position, the intermediate portion is apart from the total reflection face 11A more than the distance in which the near field light can be extracted (state of the light extracting portions 17b and 17c in FIG. 7). Driving means of the invention is constructed by the transparent electrode and voltage applying means (not shown) formed on the total reflection face 11A of the upper substrate 11, light extracting portions 17a, 17b, 17c, and 17d, and the top face of the lower substrate 21.

On the lower substrate 21, a plurality of spacers 24a and a plurality of inter-substrate spacers 25 are formed. Each of the spacers 24a and the inter-substrate spacers 25 is formed by, for example, a polycrystalline silicon film. The spacer 24a functions as a stopper and supporting portion when the light extracting portions 17a, 17b, 17c, and 17d are displaced to the second position. In this case, the spacers 24a are provided in two lines along the arranging direction of the light extracting portions 17a, 17b, 17c, and 17d. The inter-substrate spacer 25 is used to maintain an interval between the lower substrate 21 and the upper substrate 11 so that the light extracting portions 17a, 17b, 17c, and 17d can be displaced between the first and second positions. Although not shown, on the face on which the spacers 24a and the inter-substrate spacers 25 are formed of the lower substrate 21, an upper transparent electrode made of, for example, ITO is formed.

In the embodiment, the optical switching element 10 of one line corresponding to one pixel is constructed by the four light extracting portions 17a, 17b, 17c, and 17d having different widths (areas). A plurality of optical switching elements 10 are arranged in an array, thereby constructing the one-dimensional optical switching device 1.

A specific manufacturing method of the optical switching device 1 will now be described. The manufacturing process of the optical switching device 1 having the optical switching element 10 constructed by the four light extracting portions 17a, 17b, 17c, and 17d having different widths (areas) will now be described.

Figure 8A:
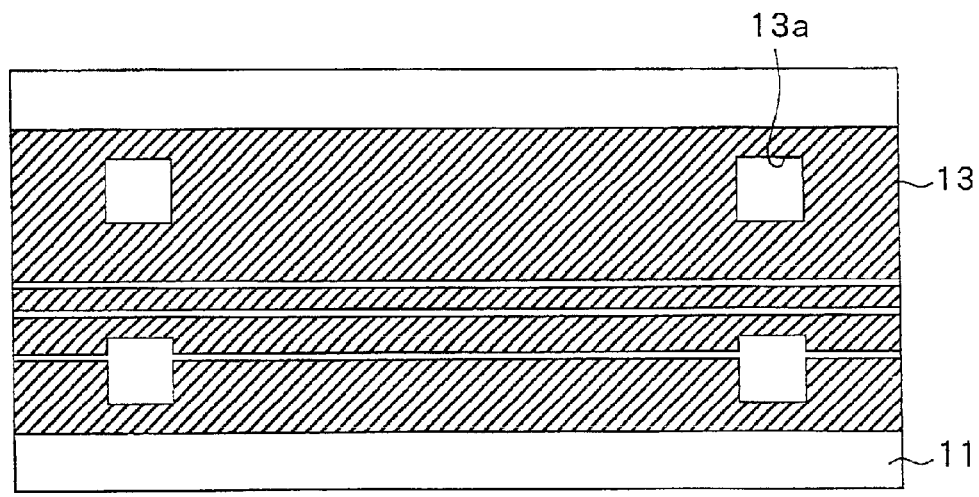
FIGS. 8A and 8B are plan view and cross section for explaining a manufacturing process of the optical switching device shown in FIG. 7.
Figure 8B:
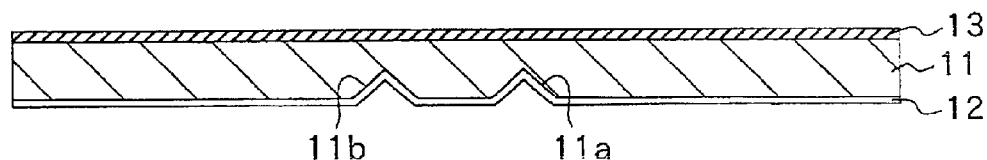

First, as shown in FIGS. 8A and 8B, on the top face of the upper substrate 11 which is a translucent substrate, for example, a glass substrate, the V-shaped groove 11a serving as a light incident portion and the V-shaped groove 11b serving as a light emitting portion are formed by, for example, physical process such as etching or mechanical process such as process using a grinder. Subsequently, AR (anti-reflection) coating is performed on the face in which the V-shaped grooves 11a and 11b are formed by, for example, vacuum evaporation to thereby form the anti reflection film 12 made of, for example, $MgF_2$. On the face (total reflection face 11A) opposite to the face in which the V-shaped grooves 11a and 11b are formed, for example, by CVD (Chemical Vapor Deposition), the transparent electrode (such as ITO film) having a thickness of, for instance, 50 nm and a (transparent) insulating film (such as silicon oxide ($SiO_2$) film) having a thickness of, for example, 30 nm are formed in this order. A stacked film 13 including the upper transparent electrode is patterned in an electrode shape (shape corresponding to the light extracting portions 17a, 17b, 17c, and 17d) by etching. The insulating film serves as a protective film of the upper transparent electrode (ITO film).

Figure 9:
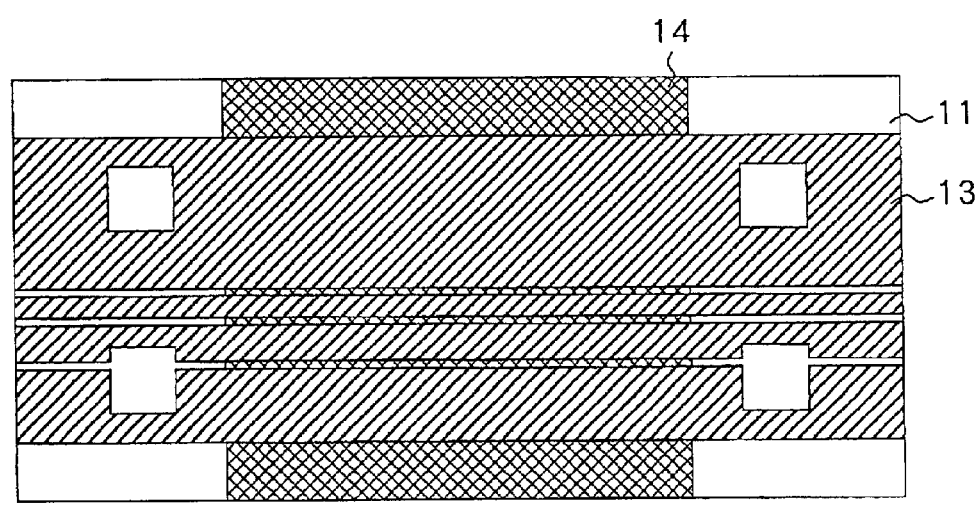
FIG. 9 is a plan view for explaining a process following the process of FIGS. 8A and 8B.

As shown in FIG. 9, a light absorption layer 14 for absorbing unnecessary light is formed so as to be thinner than the electrode between the electrode patterns by, for example, vacuum evaporation. Subsequently, as shown in FIG. 10, a sticking preventing layer 15 having a thickness of, for example, 2 nm made of a fluoroplastic or the like is formed. On the sticking preventing layer 15, a sacrifice layer 16 having a thickness of, for example, 400 nm made of amorphous silicon (a-Si) or the like is formed and patterned in the shapes of the light extracting portions 17a, 17b, 17c, and 17d by etching. The sticking preventing layer 15 is used to prevent the thin ribbon-shaped light extracting portion 17a described hereinlater from being stuck to the upper substrate 11. The sacrifice layer 16 is provided to manufacture the light extracting portions 17a, 17b, 17c, and 17d so as to have the bridge structure in which the intermediate portion of each of the light extracting portions 17a, 17b, 17c, and 17d is apart from the total reflection face 11A of the upper substrate 11 by a half wave or more.

Figure 12:
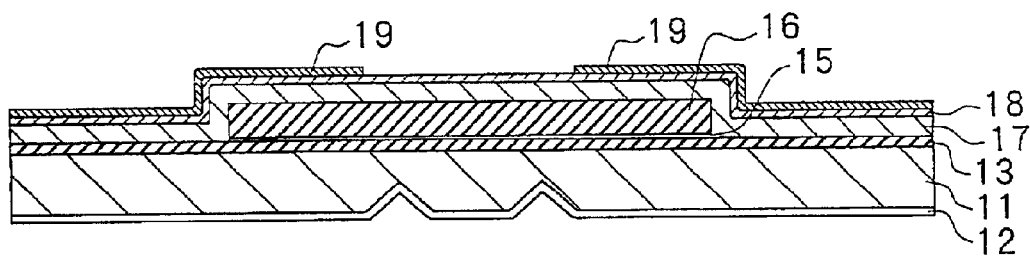
FIG. 12 is a cross section for explaining a process following the process of FIGS. 11A and 11B.

Subsequently, as shown in FIGS. 11A and 11B, as the structural material of the light extracting portions 17a, 17b, 17c, and 17d, a silicon nitride film 17 having a thickness of, for example, 100 nm is formed by, for example, LPCVD (Low Pressure Chemical Vapor Deposition). As shown in FIG. 12, an ITO film 18 is formed as a transparent movable electrode having a thickness of, for example, 50 nm and an aluminum (Al) film 19 having a thickness of, for example, 20 nm is formed on the ITO film 18. The aluminum film 19 functions as a protective layer of the ITO film 18 when a silicon oxide film ($SiO_2$) 20 which will be described hereinlater is tapered.

Figure 13:
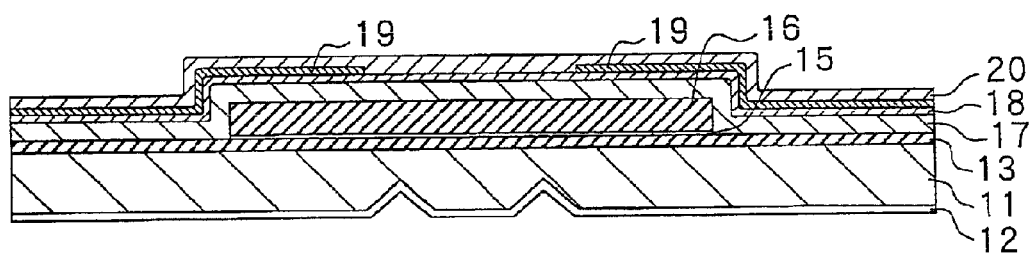
FIG. 13 is a cross section for explaining a process following the process of FIG. 12.
Figure 14:
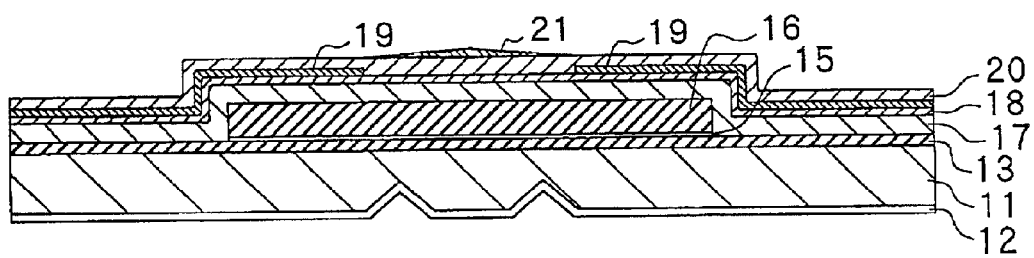
FIG. 14 is a cross section for explaining a process following the process of FIG. 13.
Figure 15:
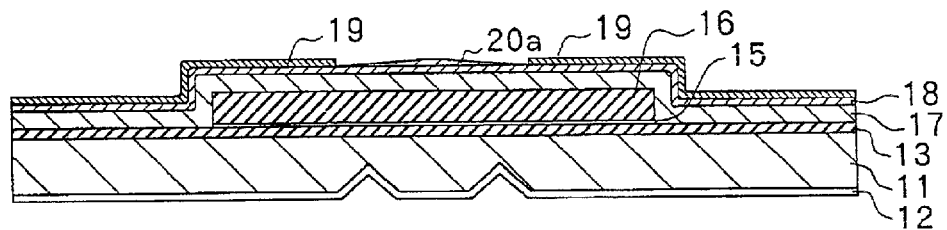
FIG. 15 is a cross section for explaining a process following the process of FIG. 14.

After that, a tapering process is performed so that light entering the light extracting portions 17a, 17b, 17c, and 17d is not totally reflected by the back face of the light extracting portions 17a, 17b, 17c, and 17d. In order to perform the process, first, as shown in FIG. 13, the silicon oxide film 20 having a thickness of, for example, 1 μm is formed by LPCVD or the like. Subsequently, as shown in FIG. 14, a resist film 21 is applied on the silicon oxide film 20 and is exposed by using a gray scale mask to be processed in a tapered shape. Subsequently, as shown in FIG. 15, by selectively removing the silicon oxide film 20 by using the tapered resist film 21 as a mask by, for example, RIE (Reactive Ion Etching), a tapered portion 20a is formed.

Figure 16A:
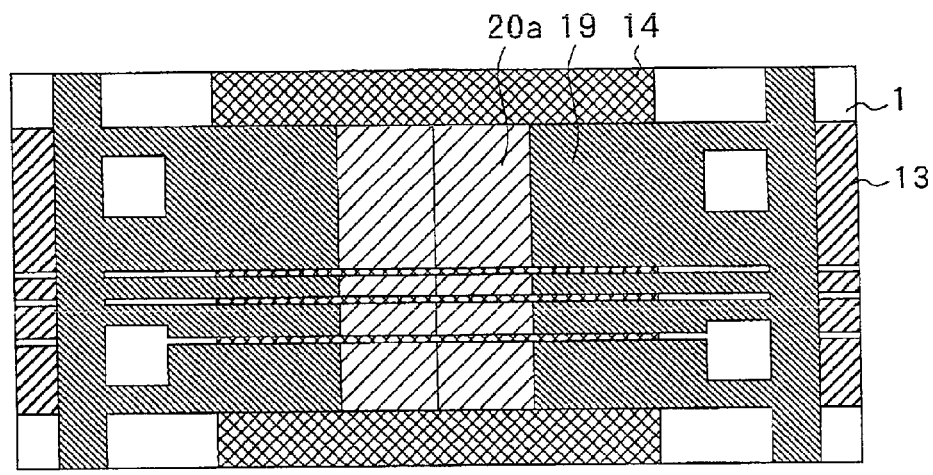
FIGS. 16A and 16B are plan views for explaining a process following the process of FIG. 15.
Figure 16B:
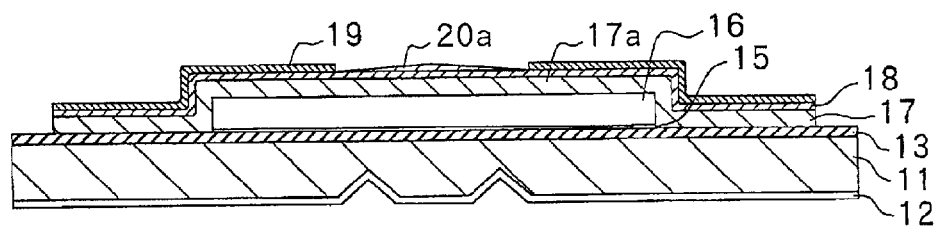

As shown in FIGS. 16A and 16B, the silicon nitride film 17, ITO film 18, aluminum film 19, tapered portion 20a, sticking preventing layer 15, and sacrifice layer 16 are patterned in shapes corresponding to the light extracting portions 17a, 17b, 17c, and 17d by dry etching. After that, the sacrifice layer 16 made of amorphous silicon is removed by dry etching using xenon fluoride ($XeF_2$). By the operation, the silicon nitride film 17 is formed into the thin ribbon-shaped light extracting portions 17a, 17b, 17c, and 17c having the bridge structure. The widths (areas) of the four light extracting portions 17a, 17b, 17c, and 17d are set at a ratio of, for example, 1:2:4:8.

Figure 17:
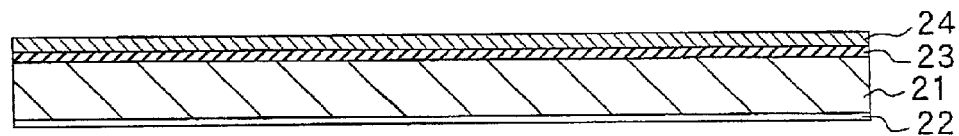
FIG. 17 is a cross section for explaining a process following the process of FIGS. 16A and 16B.

As shown in FIG. 17, the lower substrate 21 disposed on the side opposite to the light incident side is prepared. One of the faces of the lower substrate 21 is subjected to, for example, AR (anti-reflection) coating to form an anti-reflection film 22 made of $MgF_2$ for preventing inner face reflection. On the face of the lower substrate 21 opposite to the anti-reflection film 22 side, for example, an ITO film serving as a lower transparent electrode, an insulating layer such as a silicon oxide ($SiO_2$) film, and an anti-reflection film made of $MgF_2$ are sequentially formed in accordance with this order to form a stack film 23. Further, on the stack film 23, a polycrystalline silicon film 24 having a thickness of, for example, 1.1 μm is formed by LPCVD or the like.

Figure 18A:
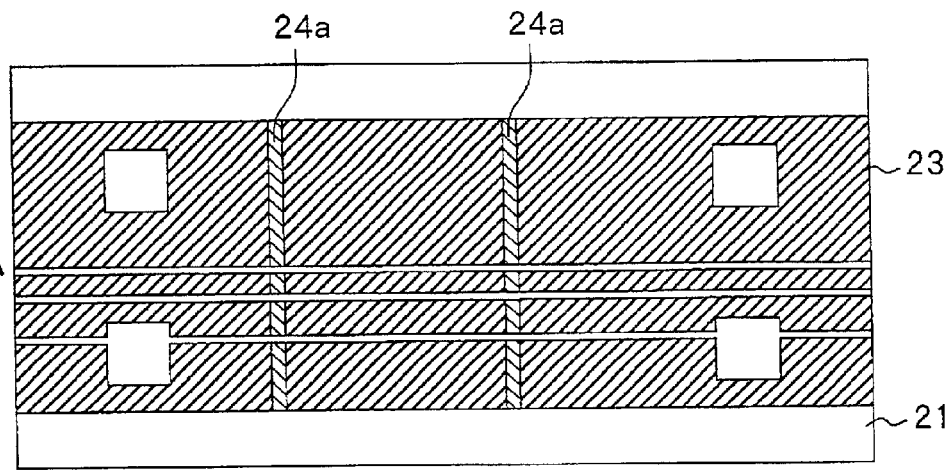
FIGS. 18A and 18B are cross sections for explaining a process following the process of FIG. 17.
Figure 18B:
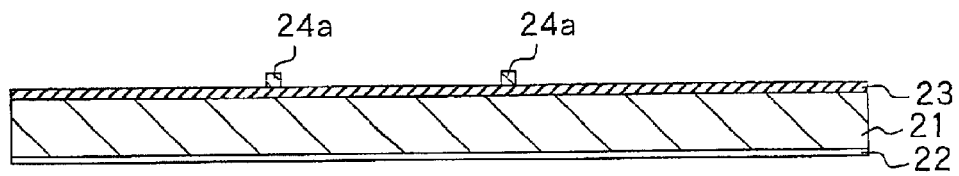

As shown in FIGS. 18A and 18B, the polycrystalline silicon film 24 is patterned to form the spacers 24a for preventing contact between the light extracting portions 17a, 17b, 17c, and 17d formed on the upper substrate 11 side in the preceding process and the lower transparent electrode (ITO film) on the lower substrate 21 side. Subsequently, the stack film 23 is patterned in an electrode shape (shape corresponding to the light extracting portions 17a, 17b, 17c, and 17d formed on the upper substrate 11 side).

Figure 19A:
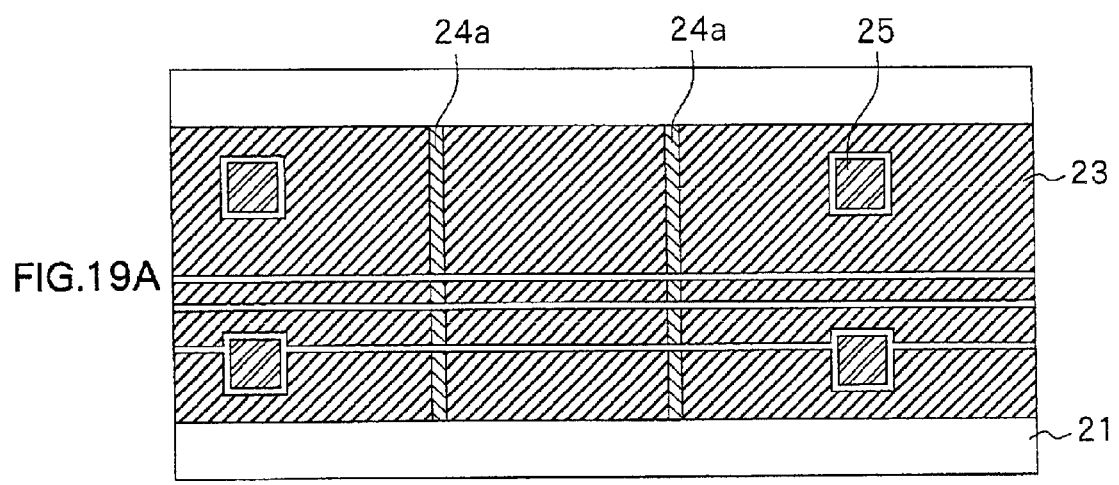
FIGS. 19A and 19B are plan views for explaining a process following the process of FIGS. 18A and 18B.
Figure 19B:
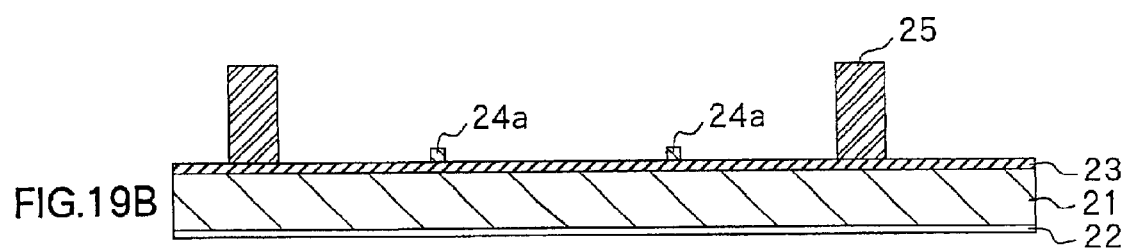

As shown in FIGS. 19A and 19B, a polycrystalline silicon film having a thickness of, for example, 2.2 μm is formed. By patterning the polycrystalline silicon film, the inter-substrate spacers 25 between the upper substrate 11 on which the light extracting portions 17a, 17b, 17c, and 17d are formed and the lower substrate 21 on which the lower transparent electrode is formed are formed.

Figure 20:
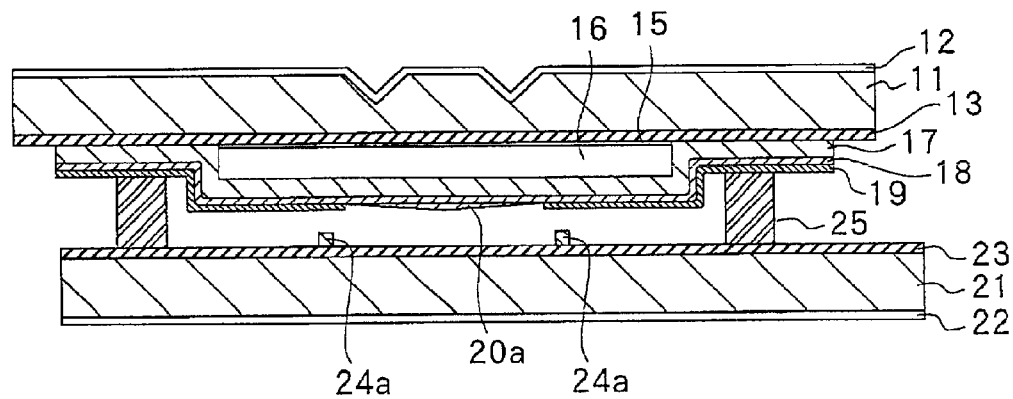
FIG. 20 is a cross section for explaining a process following the process of FIGS. 19A and 19B.

Finally, as shown in FIG. 20, the upper substrate 11 and the lower substrate 21 are joined to each other with the inter-substrate spacers 25 inbetween by using In (indium) as a joint layer, thereby finishing a series of processes. The optical switching device 1 including the optical switching elements 10 each having the four light extracting portions 17a, 17b, 17c, and 17d having different widths (areas) is completed.

The aspect ratio in the drawings used for explaining the manufacturing process is different from an actual one for easier understanding. In practice, for example, the length of the movable portion of each of the ribbon-shaped light extracting portions 17a, 17b, 17c, and 17d is 120 μm, the widths of the light extracting portions 17a, 17b, 17c, and 17d are 4 μm, 8 μm, 16 μm, and 32 μm, respectively, and the distance between the neighboring light extracting portions 17a is 0.5 μm.

The operation of the thin ribbon-shaped light extracting portion 17a as a component of the optical switching element 10 according to the embodiment will be described with reference to FIGS. 21A and 21B. The operations of the other three light extracting portions 17b, 17c, and 17d are similar to the operation of the light extracting portion 17a, and the light extracting portions 17a, 17b, 17c, and 17d can be driven independent of each other.

A transparent movable electrode (not shown) formed on the thin ribbon-shaped light extracting portion 17a is grounded to set the potential as 0V, and a voltage of, for example, +12V is applied to the upper transparent electrode (not shown) formed on the upper substrate 11. By the potential difference, electrostatic attraction is generated between the light extracting portion 17a and the upper substrate 11. As shown in FIG. 21A, the light extracting portion 17a comes into contact with the upper substrate 11 (first position). In this state, light $P_1$ is perpendicularly incident on an inclined face of the V-shaped groove 11a in the upper substrate 11. The incident light $P_1$ passes through the upper substrate 11, enters the light extracting portion 17a, emits from the tapered portion 20a formed on the back face of the light extracting portion 17a, after that, transmits the lower substrate 21, and converts as transmission light P2.

Figure 21A:
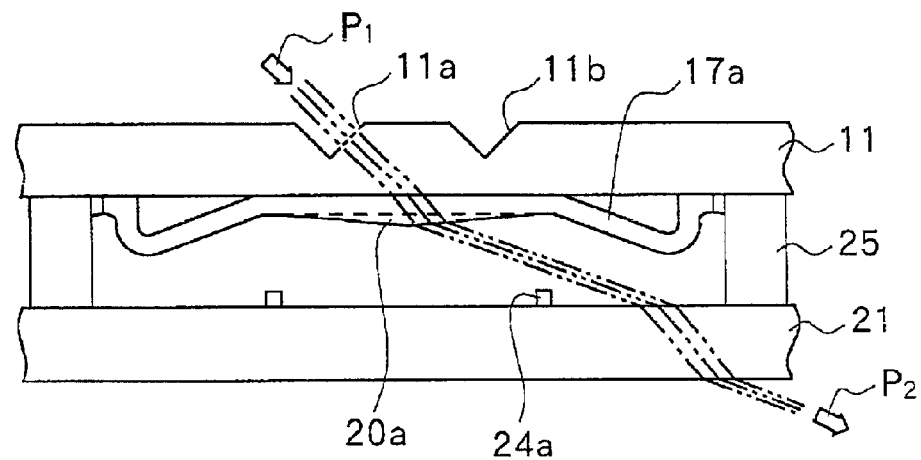
FIGS. 21A and 21B are cross sections for explaining the operation of the optical switching device shown in FIG. 7.
Figure 21B:
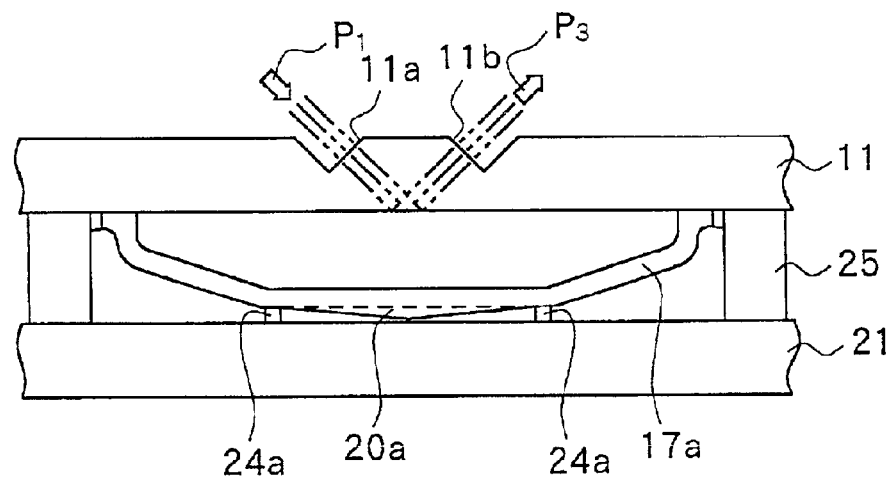

After that, the light extracting portion 17a is separated from the upper substrate 11 into a state of FIG. 21B. Specifically, the upper transparent electrode (not shown) formed on the upper substrate 11 is grounded to set the potential as 0V and, simultaneously, a voltage of, for example, +12V is applied to the lower transparent electrode (not shown) formed on the lower substrate 21. By the potential difference, electrostatic attraction is generated between the lower transparent electrode and the transparent movable electrode on the light extracting portion 17a having the potential of 0V, and the light extracting portion 17a is attracted by the lower substrate 21 side. At this time, the light extracting portion 17a comes into contact with the spacer 24a on the lower substrate 21 and is stopped (second position). In this state, the incident light $P_1$ is totally reflected by the under face (total reflection face 11A) of the upper substrate 11, and emits as total reflection light $P_3$ from the other V-shaped groove 11b processed separately from the V-shaped groove on the incident side.

As described above, according to the embodiment, by the operation of the light extracting portion 17a, the incident light $P_1$ can be switched in the two directions and taken as the transmission light $P_2$ and the total reflection light $P_3$. In the optical switching element 10, the movable portion is only the light extracting portion 17a, and the distance of movement of the light extracting portion 17a is at most about one wavelength of incident light. Consequently, the switching operation is performed at very high speed. Since electrodes can be formed on and under the light extracting portion 17a as the movable portion, fast response can be achieved irrespective of a mechanical resonance frequency.

In addition, in the optical switching element 10 of the embodiment, one pixel is constructed by the thin ribbon-shaped four light extracting portions 17a, 17b, 17c, and 17d having different widths (areas), which can be independently driven. In the case of performing gradation display of an image, not only the gradation display by the time division but also the area gradation display can be performed.

Specifically, an example of the gradation display method combining the area gradation display and gradation display by time division per pixel will be described by using FIG. 22. In this case, a gradation number can be expressed by "area×time". An image having a smaller gradation number is dark, and an image having a large gradation number is light. That is, 0 indicates the darkest state (black). In the embodiment, the ratio of the widths (areas) of the ribbon-shaped light extracting portions 17a, 17b, 17c, and 17d is set as 1:2:4:8. Consequently, by combinations of the four values, the number of gradations which can be expressed by the area gradation is 16 from 0 to 15. The number of gradations which can be displayed by time division is, when it is assumed that time is changed in, for example, 16 levels from 1 to 16. The number of the brightest gradation is 240 (=15×16). Since "0" is added to 240, gradation display in 241 levels can be performed.

Only by the simply combination of time and area, gradation numbers are overlapped. Consequently, only the portion of gradation numbers displayed in hollow numerals in FIG. 22 can be used for display, the number of gradations which can be displayed is 99, and gradation display in 99 levels can be performed. When the gradation numbers are overlapped, priority is given to one having longer time. The display of the remaining gradation numbers of 142 kinds (=241-99) is performed by combining gradation numbers of 99 kinds displayed in hollow numerals. For example, in the case of displaying the gradation number 239, display is performed in the area 15 for the time 15 and, after that, display is performed in the area 14 for the remaining time 1. It is consequently calculated as 15×15+14×1=239. Display can be similarly performed with respect to each of the other gradation numbers. In such a manner, the gradation display in 241 levels can be realized.

According to the embodiment as described above, by using the optical switching element 10 having the four thin ribbon-shaped light extracting portions 17a, 17b, 17c, and 17d of different widths (area), which can be independently driven, the combination of the area gradation display and the gradation display by time division can be used in the same pixel, and the gradation display of 241 levels can be carried out. By one-dimensionally arranging the optical switching elements 10, ultra-high definition can be achieved. Since the gradation display by digital control can be performed, the optical switching element 10 with very accurate gradation expression can be realized. For a resolution to the extent used in a current TV system, it is possible to use one light extracting portion per pixel and perform the gradation display only by time division. If the resolution increases more and more in future, in the case of performing the gradation display only by time division, not only the optical switching element itself but also a drive circuit and a signal processing circuit are required to have very high frequency characteristics (hundreds MHz to a few GHz). In this case as well, in the optical switching element 10 of the embodiment, the area gradation display and the gradation display by time division can be combined. Consequently, the drive frequency can be set to be less than one tenths, and a load on the optical switching element 10, drive circuit, and signal processing circuit can be lessened.

In the embodiment, both the total reflection light $P_3$ from the total reflection face 11A of the upper substrate 11 and the transmission light $P_2$ passed through the light extracting portions 17a, 17b, 17c, and 17d can be used with respect to the incident light $P_1$, or either the transmission light $P_2$ or the total reflection light $P_3$ can be used. In the case of using both the transmission light $P_2$ and the total reflection light $P_3$, the element can be used as a two-way light polarization element having little crosstalk. In the case of using only the total reflection light $P_3$, a switching element of high light efficiency can be constructed. In the case of using only the transmission light $P_2$, an optical switching element having high contrast can be constructed. The specific configuration in the case of using only one light will be described hereinlater.

In the optical switching element 10 using such a total reflection member, the incident light $P_1$ has to be incident on the total reflection face 11A at an angle satisfying the total reflection condition. That is, in the case of using one side of the upper substrate 11 as a total reflection face, when a glass substrate having both faces parallel to each other is used as it is, light cannot be incident at an incident angle (critical angle) satisfying the total reflection condition.

In contrast, in the embodiment, the V-shaped groove 11a is formed in the upper substrate 11 by etching, molding, mechanical process, or the like, thereby enabling light to be incident at an incident angle equal to or larger the critical angle. Similarly, the V-shaped groove 11b is formed in the emitting portion from the upper substrate 11 of the total reflection light $P_3$ so that the total reflection light $P_3$ is not again totally reflected by the surface of the upper substrate 11. In the embodiment, therefore, the total reflection light $P_3$ can be efficiently taken from the incident light $P_1$.

In place of forming the V-shaped grooves 11a and 11b, by using a microprism covering both the light incident portion and the reflection light emitting portion or microprisms each covering each of the incident portion and the reflection light emitting portion, similar effects can be expected. The V-shaped grooves 11a and 11b can be also replaced by, not only the microprism, but also a cylindrical lens covering both the light incident portion and the reflection light emitting portion and having a center in the total reflection face. These specific examples will be described hereinlater as modifications.

In the embodiment, in the case of extracting light in a state where the light extracting portion 17a is made contact with the total reflection face 11A of the upper substrate 11 or is set so close to the total reflection face 11A that near-field light can be extracted, the process on extracted light in the light extracting portions 17a, 17b, 17c, and 17d becomes an issue. To be specific, when a face opposite to the light extracting face of each of the light extracting portions 17a, 17b, 17c, and 17d remains to be parallel and is not subjected to any process, light does not emit from the opposite face but is totally reflected. Consequently, the element does not function as the optical switching element. In the embodiment, therefore, by etching a face opposite to the light extraction face of each of the light extracting portions 17a, 17b, 17c, and 17d, a portion (tapered portion 20a) angled so that the incident angle of light becomes smaller than the critical angle is provided, and light can emit from the tapered portion 20a.

By the operation, in the optical switching element 10, both the transmission light $P_2$ of the light extracting portions 17a, 17b, 17c, and 17d and the total reflection light $P_3$ by the upper substrate 11 can be used with respect to the incident light $P_1$. In the case of using the element as the optical switching element using only the total reflection light $P_3$, by providing a light absorption layer on a face opposite to the light extracting face of each of the light extracting portions 17a, 17b, 17c, and 17d, light can be switched only in one direction (refer to FIGS. 28A and 28B).

On the other hand, in the case of using the element as the optical switching element using only the transmission light $P_2$ of the light extracting portions 17a, 17b, 17c, and 17d, the upper substrate 11 remains to have a flat face without being subject to a process of forming the V-shaped groove in the emitting portion of the upper substrate 11 of the total reflection light $P_3$ or is processed so as to have an angle of total reflection. In such a manner, total reflection is carried out again, so that the reflection light does not emit from the upper substrate 11 but can be led through in the upper substrate 11 in a direction parallel to the upper substrate 11 (refer to FIGS. 27A and 27B). In the case of such a configuration, however, light may be attenuated or seep through by an influence of a structure fabricated on a substrate or a layer formed, thereby causing deterioration in contrast. It is therefore necessary to pay attention fully. Similarly, in the case of an optical switching element using only the transmission light $P_2$ of the light extracting portions 17a, 17b, 17c, and 17d, by providing the light absorption layer in place of forming the V-shaped groove in the emitting portion in the upper substrate 11 of the total reflection light $P_3$, light emitting from the upper substrate can be absorbed (refer to FIGS. 26A and 26B).

In the embodiment, since the movable portions are only the ribbon-shaped light extracting portions 17a, 17b, 17c, and 17d, the movable portions are small and light. To drive the movable portions, a strong force is not necessary but the electrostatic attraction is sufficient. As the electrode for generating the electrostatic attraction, it is also possible to provide transparent electrodes for both the total reflection face 11A of the upper substrate 11 and the light extracting portions 17a, 17b, 17c, and 17d or to use an opaque conductive film, for example, an aluminum (Al) film formed so as to avoid light transmitting portions.

In order to prevent the light extracting portions 17a, 17b, 17c, and 17d from being stuck to the total reflection face 11A of the upper substrate 11, the transparent electrode is used also on the lower substrate 21 facing the upper substrate 11 so as to sandwich the light extracting portions 17a, 17b, 17c, and 17d to make the total reflection mirror face and the light extracting portions apart from each other during a period in which switching is not performed and to drive at higher speed. Instead, an opaque electrode formed so as to avoid light transmitting portions can be used.

For example, when the light extracting portions 17a, 17b, 17c, and 17d can be sufficiently prevented from being stuck to the total reflection face 11A by the sticking preventing layer 15 or the high speed of driving can be sufficiently kept, it is not always necessary to use the lower substrate 21.

In the optical switching element using only the total reflection light $P_3$ with respect to the incident light $P_1$, in the case where a light absorbing layer is formed on a face opposite to the light extracting face of each of the light extracting portions 17a, 17b, 17c, and 17d, the lower substrate 21 having no total reflection face does not always have to be a glass substrate but may be a silicon (Si) substrate. Obviously, in this case, it is unnecessary to use the transparent electrode or form an opaque electrode so as to avoid only a light transmitting portion.

Referring to FIGS. 23A and 23B to FIGS. 29A and 29B, modifications of the foregoing embodiment will be described hereinbelow. The same components as those in the embodiment are designated by the same reference numerals and their description will not be repeated. Since the basic configuration, action and effects are similar to those in the foregoing embodiment, only different parts will be described in the following.

Figure 26A:
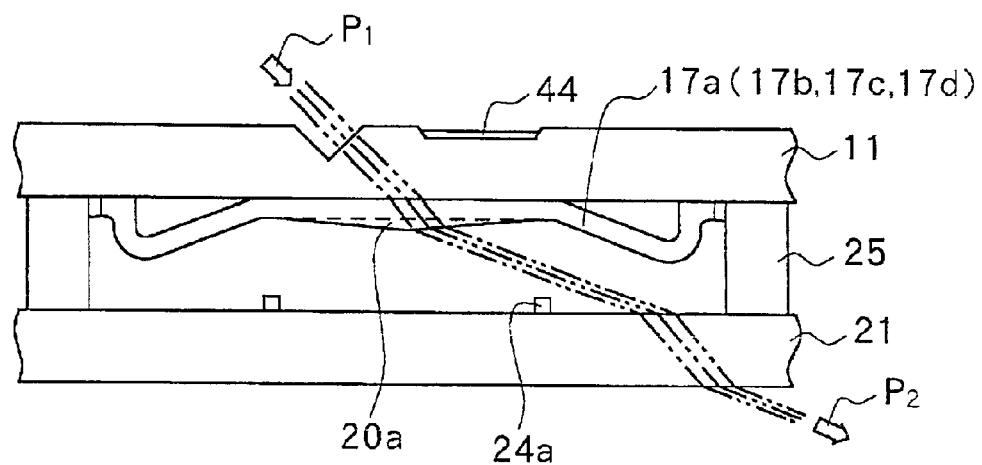
FIGS. 26A and 26B are cross sections for explaining further another modification of the optical switching device shown in FIG. 7.
Figure 26B:
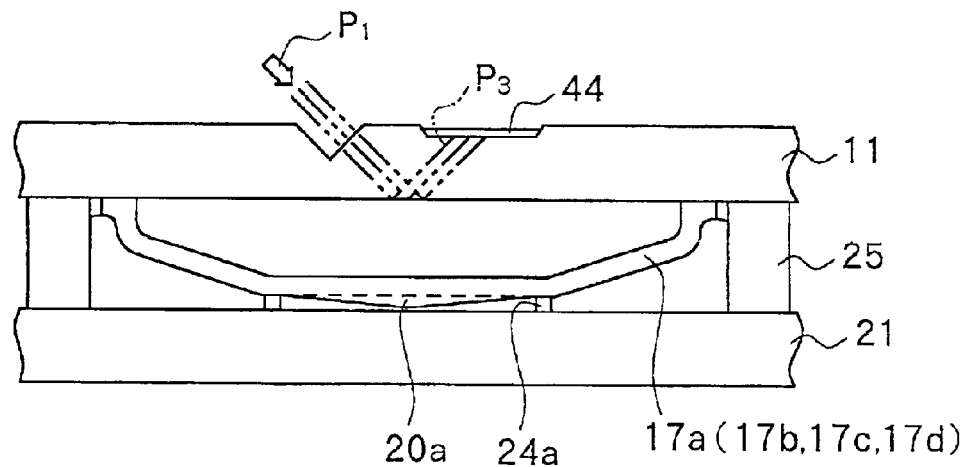
Figure 27A:
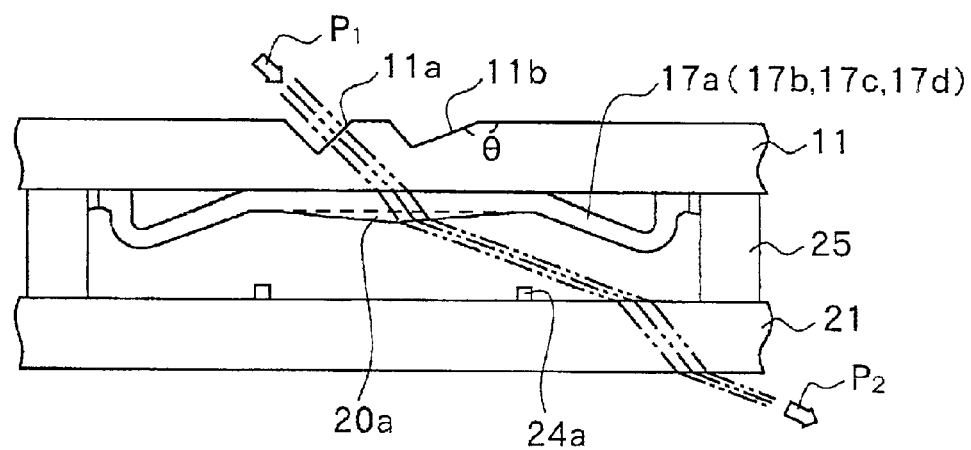
FIGS. 27A and 27B are cross sections for explaining further another modification of the optical switching device shown in FIG. 7.
Figure 27B:
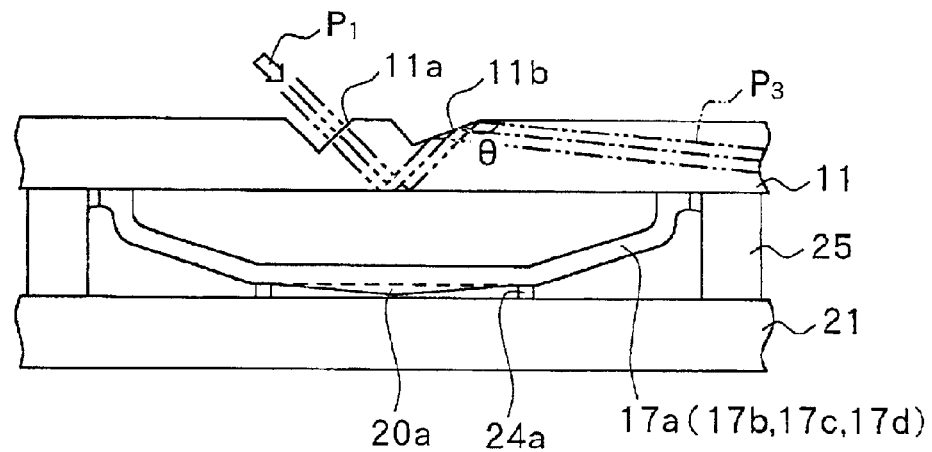

Each of FIGS. 23A and 23B to FIGS. 25A and 25B shows an optical switching element capable using both total reflection light by the upper substrate 11 and the transmission light of the light extracting portions 17a, 17b, 17c, and 17d. FIGS. 26A and 26B show an optical switching element capable of using only transmission light. FIGS. 27A and 27B show an optical switching element basically using only transmission light but can use total reflection light as well. Each of FIGS. 28A and 28B and FIGS. 29A and 29B shows a switching element capable of using only the total reflection light.

[First Modification]

Figure 23A:
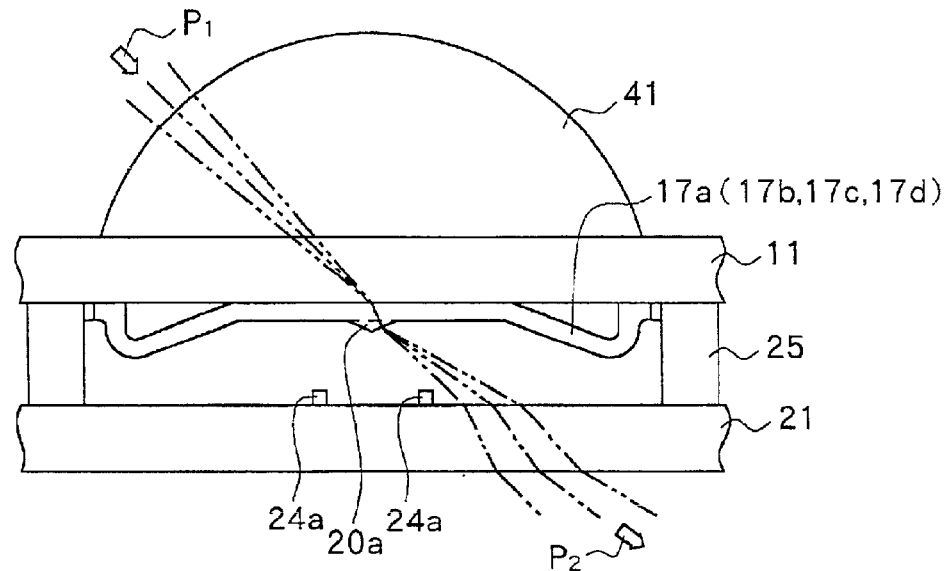
FIGS. 23A and 23B are cross sections for explaining a modification of the optical switching device shown in FIG. 7.
Figure 23B:
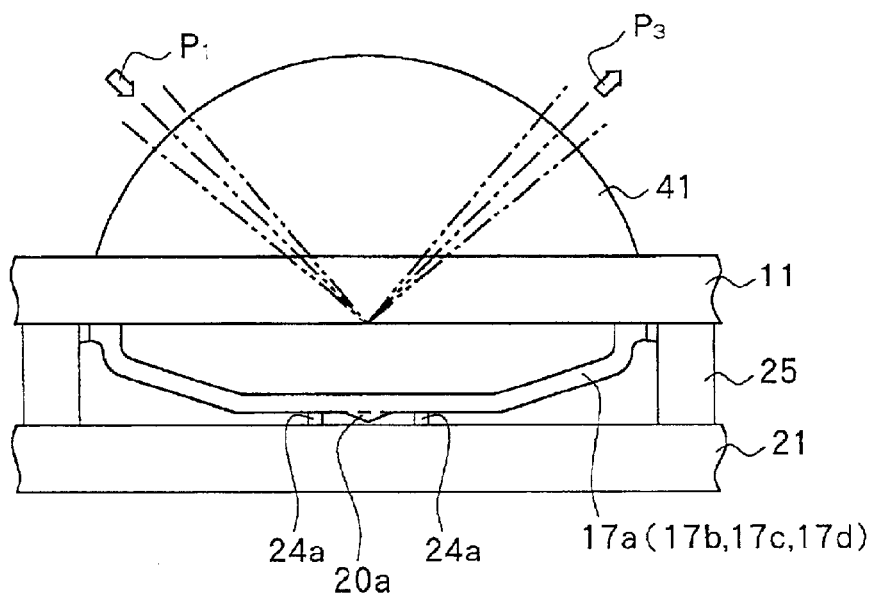

In the optical switching element shown in FIGS. 23A and 23B, in place of the V-shaped grooves 11a and 11b used to make the light $P_1$ incident at an angle the light can be totally reflected by the under face of the upper substrate 11 in FIGS. 21A and 21B, a cylindrical lens 41 having a center on the under face of the upper substrate 11 is used. In the optical switching element, the light $P_1$ can be made incident at an angle so as to be totally reflected by the under face of the upper substrate 11. The angle and size of the tapered portion 20a formed on the light extracting portions 17a, 17b, 17c, and 17d have to be set to values different from those in FIGS. 21A and 21B.

[Second Modification]

Figure 24A:
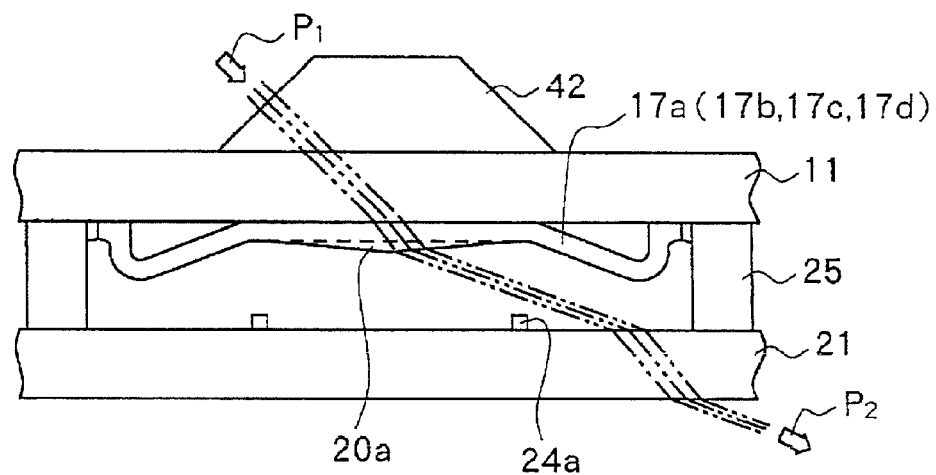
FIGS. 24A and 24B are cross sections for explaining another modification of the optical switching device shown in FIG. 7.
Figure 24B:
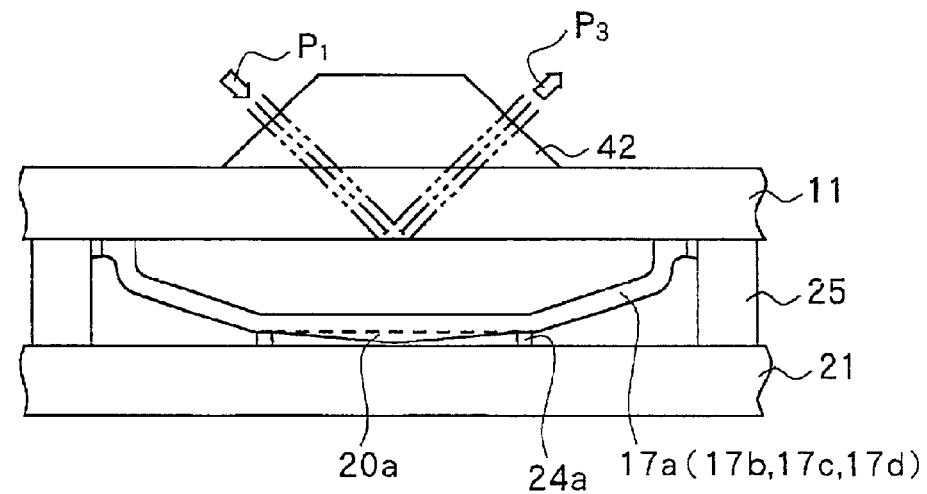

In an optical switching element shown in FIGS. 24A and 24B, in place of the V-shaped grooves 11a and 11b in FIGS. 21A and 21B, a microprism 42 having an isosceles trapezoid in cross section is used. When the light incident angle is the same as that in the case of FIGS. 21A and 21B and the inclined face of the trapezoid cross section is perpendicular to the light incident angle (that is, the inclined angle of each of the V-shaped grooves 11a and 11b of FIGS. 21A and 21B and the inclined angle of the trapezoid cross section are equal to each other), the structures of the light extracting portions 17a, 17b, 17c, and 17d, and the other components except for the upper substrate 11 may be the same as those in FIGS. 21A and 21B.

Figure 25A:
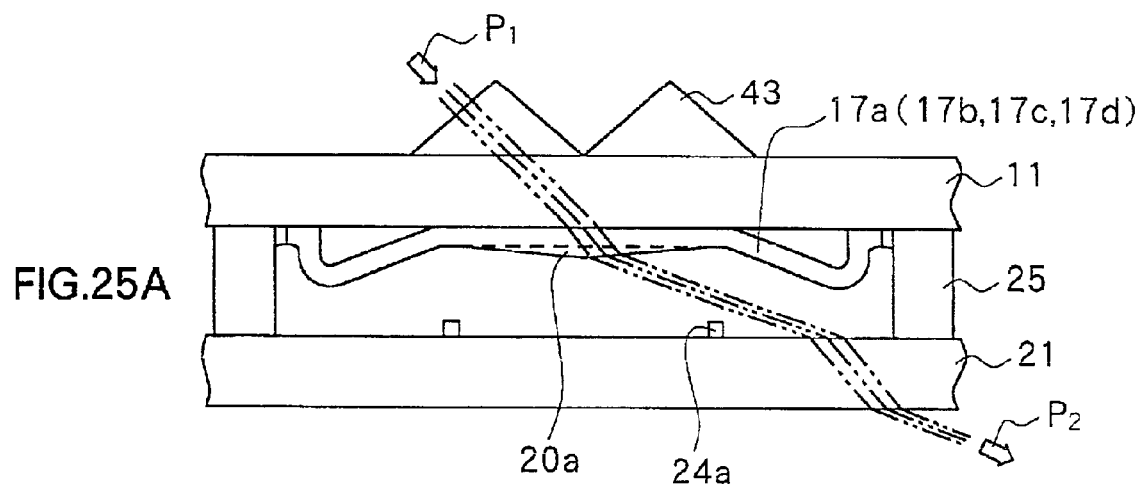
FIGS. 25A and 25B are cross sections for explaining further another modification of the optical switching device shown in FIG. 7.
Figure 25B:
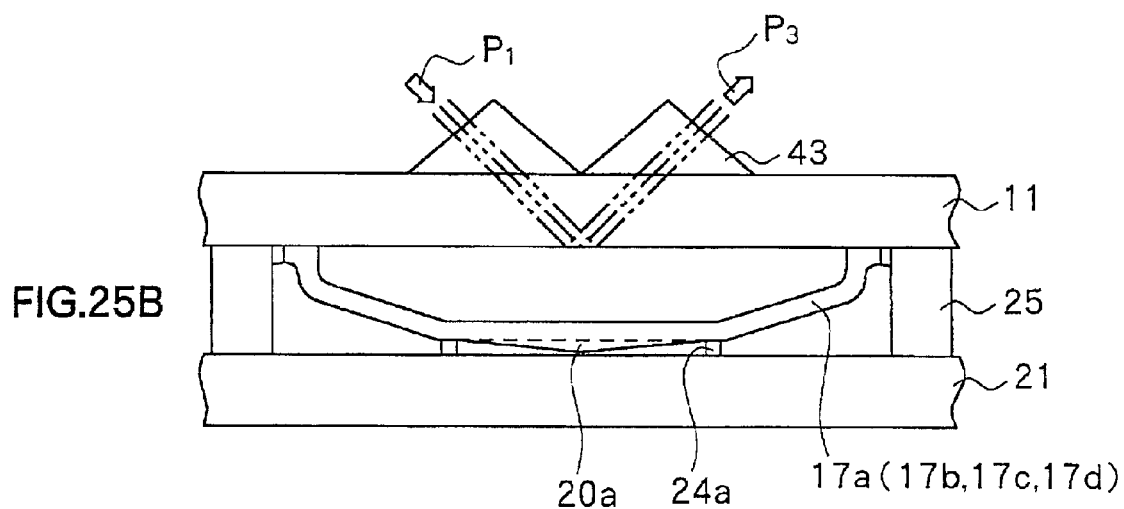

In the optical switching element shown in FIGS. 25A and 25B, in place of the V-shaped grooves 11a and 11b of FIGS. 21A and 21B, a microprism 43 having an isosceles triangle in cross section is used for each of the light incident portion and the total reflection light emitting portion. In a manner similar to FIGS. 24A and 24B, when the light incident angle is the same as in FIGS. 21A and 21B and the base angle of the isosceles triangle cross section is perpendicular to the incident angle of light (that is, when the inclination angle of the V-shaped grooves 11 and 11b in FIGS. 21A and 21B and the base angle of the isosceles triangle cross section are equal to each other), the structures of the light extracting portions 17a, 17b, 17c, and 17d and other components except for the upper substrate 11 may be quite the same as those in FIGS. 21A and 21B.

In the optical switching element shown in FIGS. 26A and 26B, in place of the V-shaped groove 11b on the light emitting side of the upper substrate 11 in FIGS. 21A and 21B, a light absorbing layer 44 is provided. Since the total reflection light $P_3$ from the bottom face of the upper substrate 11 is absorbed by the light absorbing layer 44, the optical switching element can be effectively used only for the transmission light $P_2$ from the light extracting portions 17a, 17b, 17c, and 17d.

In the optical switching element shown in FIGS. 27A and 27B, the angle θ formed between the V-shaped groove 11B on the light emitting side of the upper substrate 11 and the top face of the upper substrate 11 is set to an angle so that, different from the V-shaped groove 11a on the incident side, the total reflection light $P_3$ travels in the substrate almost in parallel with the top face of the substrate. For example, when the incident angle of the incident light $P_1$ with respect to the upper substrate 11 is set to 45 degrees, it is sufficient to set the angle θ to be equal to 157.5 degrees. By the setting, the total reflection light $P_3$ from the under face of the upper substrate 11 is again totally reflected by the V-shaped groove 11b, travels in the upper substrate 11, and is led to the outside of the substrate. The light can be also used as light absorbed or switched by an end face of the substrate or the outside of the substrate. In the case where various structures are manufactured on the upper substrate 11, once light enters the structures, it becomes noise or attenuates, so that attention has to be paid.

Figure 28A:
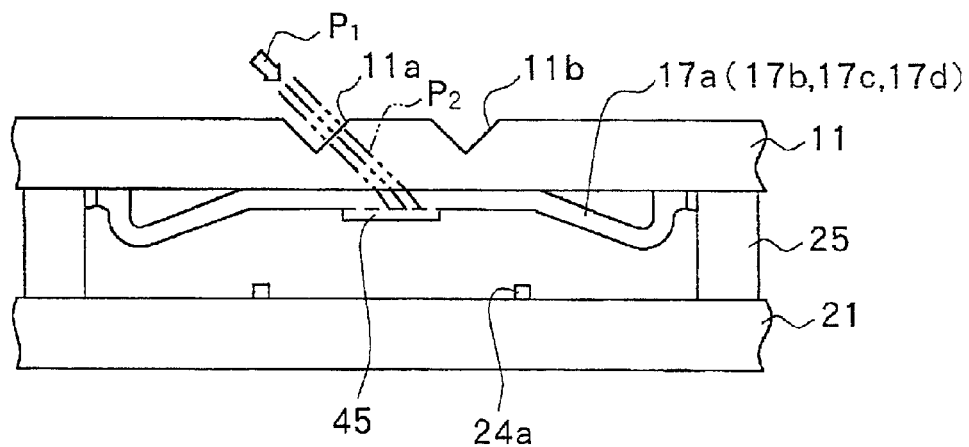
FIGS. 28A and 28B are cross sections for explaining further another modification of the optical switching device shown in FIG. 7.
Figure 28B:
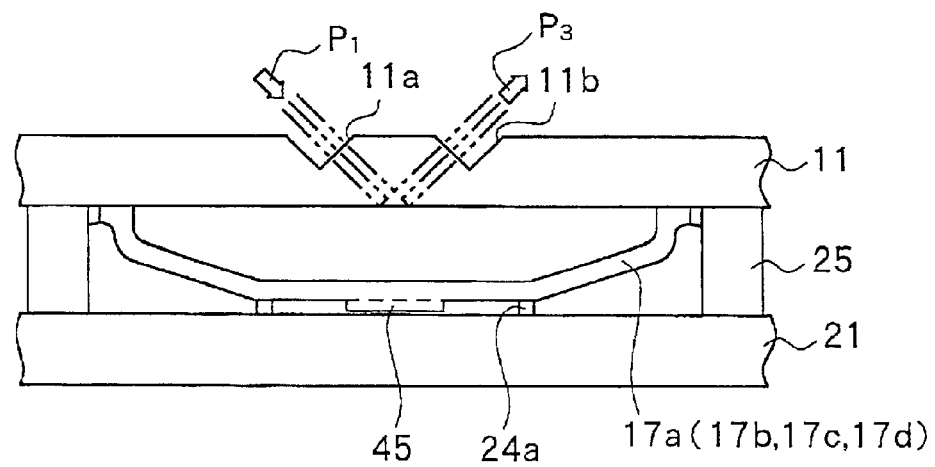

In the optical switching element shown in FIGS. 28A and 28B, in place of the tapered portion 20a formed on the light extracting portions 17a, 17b, 17c, and 17d in FIGS. 21A and 21B, a light absorbing layer 45 is formed. The optical switching element absorbs the light $P_2$ passed through the light extracting portions 17a, 17b, 17c, and 17d from the upper substrate 11 by the light absorbing layer 45 and makes only the total reflection light $P_3$ valid. Obviously, in the switching element, it is unnecessary to provide the tapered portion in each of the light extracting portions 17a, 17b, 17c, and 17d.

Figure 29A:
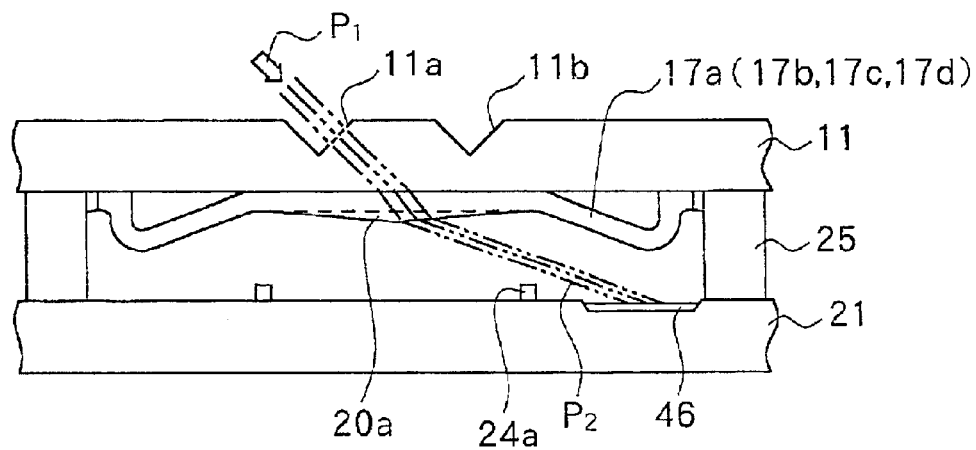
FIGS. 29A and 29B are cross sections for explaining further another modification of the optical switching device shown in FIG. 7.
Figure 29B:
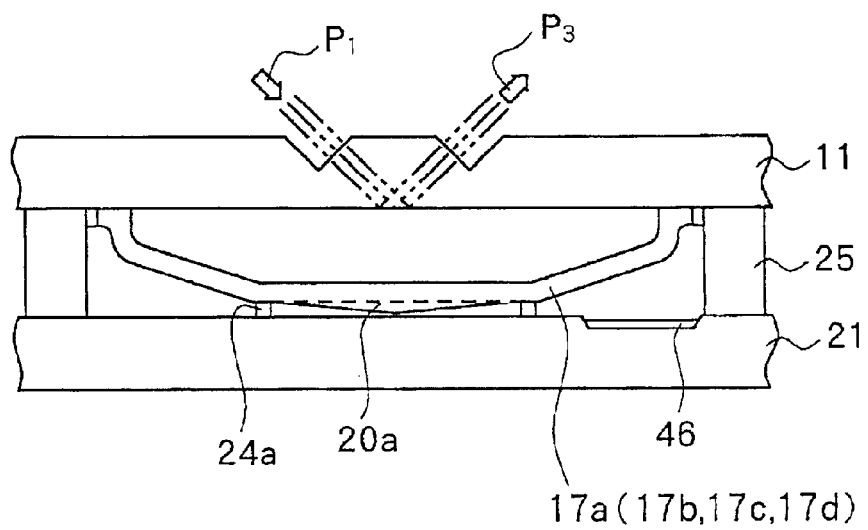

In the optical switching element shown in FIGS. 29A and 29B, a light absorbing layer 46 is formed in a portion on which light $P_2$ passed through the light extracting portions 17a, 17b, 17c, and 17d on the lower substrate 21 falls. By the operation, an optical switching element in which only the total reflection light $P_3$ is valid can be obtained.

The modifications have been described above. Not only the combination of the V-shaped groove and the light absorbing layer but also a combination of a microprism or cylindrical lens and a light absorbing layer can be applied.

[Image Display]

Figure 30:
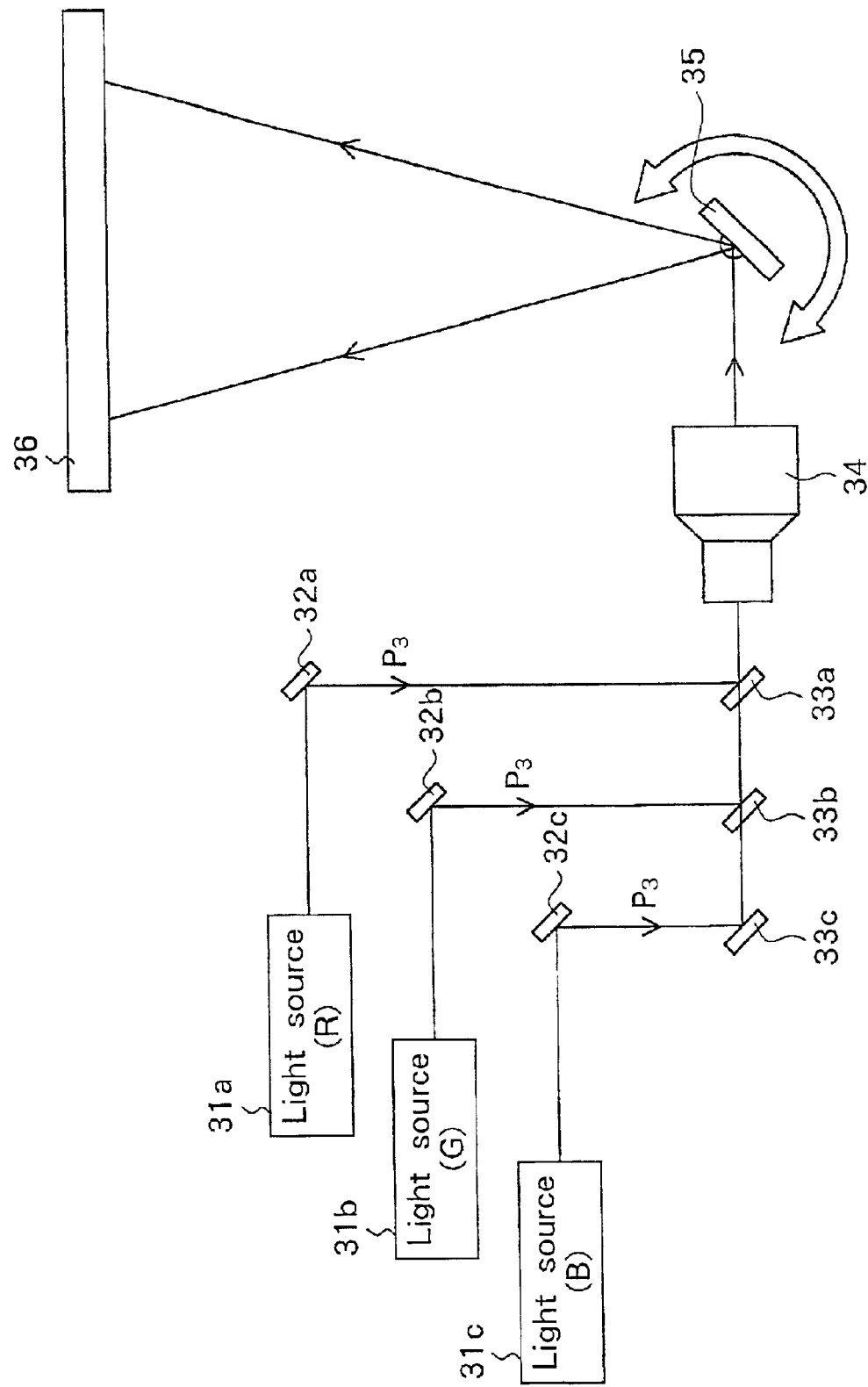
FIG. 30 is a configuration diagram of a display to which the optical switching device shown in FIG. 7 is applied.

FIG. 30 shows the configuration of a projection display as an example of an image display using the switching element 10 or the switching device 1. An example of using the total reflection light $P_3$ from the switching element 10 for displaying an image will be described here. Obviously, the transmission light $P_2$ of the light extracting portions 17a, 17b, 17c, and 17d can be used.

This projection display comprises light sources 31a, 31b, and 31c of red (R), green (G), and blue (B), respectively, switching element arrays 32a, 32b, and 32c provided for the corresponding each light sources, mirrors 33a, 33b, and 33c, a projection lens 34, a galvanometer mirror 35 as a uniaxial scanner, and a screen 36. The light sources 31a, 31b, and 31c of RGB employs a method of using RGB lasers, a method of producing RGB light from light emitted from a white light source by using a dichroic mirror, a color filter, or the like. The three primary colors may be, not only red, green and blue, but also cyan, magenta, and yellow. In each of the switching element arrays 32a, 32b, and 32c, a necessary plural number of, for example, one thousand of switching elements 10 are one-dimensionally arranged, thereby constructing a light valve (spatial light modulator).

In the projection display, light emitted from the light sources 31a, 31b, and 31c of RGB is incident on the optical switching element arrays 32a, 32b, and 32c, respectively. The total reflection light $P_3$ from the optical switching elements 10 is condensed by the mirrors 33a, 33b, and 33c to the projection lens 34. The light condensed by the projection lens 34 is scanned by the galvanometer mirror 35 and is projected as a two-dimensional image onto the screen 36.

As described above, in the projection display, the plurality of optical switching elements 10 are arranged one dimensionally and irradiated with light of RGB, and switched light is scanned by the uniaxial scanner, thereby enabling a two-dimensional image to be displayed.

In the optical switching element 10 having the four thin ribbon-shaped light extracting portions 17a, 17b, 17c, and 17d of different widths (areas), which can be independently driven as described in the embodiment, gradation display of 241 levels under digital control in which the area gradation display and the gradation display by time division are combined is performed in the same pixel. Thus, ultra-high-definition gradation display can be performed with high accuracy.

Since the response of the optical switching element 10 is sufficiently high, it is also possible to display a color image by using one optical switching element one-dimensional array for RGB colors and irradiating the optical switching element one-dimensional array with the RGB light while switching the light in a time-division manner.

Although the invention has been described above by the embodiment and modifications, the invention is not limited to the embodiment and modifications but can be variously modified. For example, as the optical switching device 1, the structure in which the optical switching elements 10 are one-dimensionally arranged is used in the foregoing embodiment. Instead, an optical switching device 1 in which the optical switching elements 10 are arranged two-dimensionally may be used.

In the foregoing embodiment, the example in which the number of light extracting portions constructing one pixel is four and the light extracting portions have different widths (areas) at the ratio of 1:2:4:8 has been described. The number of light extracting portions is not limited as long as it is plural. Some or all of the light extracting portions may have the same width. In the case where the plurality of light extracting portions constructing one pixel have the same width, the number of light extracting portions has to be large to obtain a driving frequency reduction effect similar to that in the embodiment. On the contrary, it is sufficient to form a plurality of the light extracting portions of the same structure in the process of manufacturing the light extracting portions, so that the manufacture becomes much easier.

Although the example of using the optical switching element of the invention for the display has been described in the embodiment, the optical switching element of the invention can be also applied to a device other than the display, for example, an optical printer for forming an image onto a photosensitive drum.

As described above, according to the invention, the optical switching element or the optical switching device has: a total reflection member having a total reflection face by which incident light can be totally reflected; and a plurality of translucent thin light extracting portions constructing one pixel, each of which can be switched between a first position at which the light extracting portion comes into contact with or is close to the total reflection face of the total reflection member in a distance in which near field light can be extracted and a second position apart from the total reflection face by more than the distance in which the near field light can be extracted. Consequently, the light extracting portions as movable portions can be formed small and light, so that high response can be achieved. Since the position of each of the plurality of light extracting portions constructing one pixel can be selectively switched, gradation display by area gradation can be realized.

Obviously many modifications and variations of the present invention are possible in the light of the above teachings. It is therefore to be understood that within the scope of the appended claims the invention may be practiced otherwise than as specifically described.

What is claimed is:

1. An optical switching element comprising:
  a total reflection member having a total reflection face by which incident light can be totally reflected; and
  a plurality of translucent light extracting portions constructing one pixel, each of which can be switched between a first position at which the light extracting portion comes into contact with or is close to the total reflection face of the total reflection member in a distance in which near field light can be extracted and a second position apart from the total reflection face by more than the distance in which the near field light can be extracted,
  wherein areas of faces for extracting incident light of at least two of the plurality of light extracting portions are different from each other.

2. An optical switching element according to claim 1, wherein areas of faces for extracting incident light of all of the plurality of light extracting portions are different from each other.

3. An optical switching element according to claim 2, wherein a ratio of the areas of the faces for extracting the incident light of the plurality of light extracting portions is $2^n$ (where n is an integer of 0 or larger).

4. An optical switching element comprising:
  a total reflection member having a total reflection face by which incident light can be totally reflected;
  a plurality of translucent light extracting portions constructing one pixel, each of which can be switched between a first position at which the light extracting portion comes into contact with or is close to the total reflection face of the total reflection member in a distance in which near field light can be extracted and a second position apart from the total reflection face by more than the distance in which the near field light can be extracted, and
  driving means for displacing the light extracting portion to either the first position or the second position in accordance with the leading direction of the incident light,
  wherein the total reflection member is a translucent substrate having a pair of parallel faces one of which is a light incident face and the other serving as either a total reflection face when the light extracting portion is in the second position or a light emitting face when the light extracting portion is in the first position, and
  wherein a pair of V-shaped grooves are provided on the light incident face side of the translucent substrate, the incident light is led by one of the V-shaped grooves to the total reflection face, and reflection light from the total reflection face is led to the outside by the other V-shaped groove.

5. An optical switching element comprising:
  a total reflection member having a total reflection face by which incident light can be totally reflected; and
  a plurality of translucent light extracting portions constructing one pixel, each of which can be switched between a first position at which the light extracting portion comes into contact with or is close to the total reflection face of the total reflection member in a distance in which near field light can be extracted and a second position apart from the total reflection face by more than the distance in which the near field light can be extracted,
  wherein on a face on the side opposite to the total reflection member side of the light extracting portion, a total reflection preventing portion for preventing total reflection by the light extracting portion of incident light passed through the total reflection member when the light extracting portion is in the first position is provided, and
  wherein the total reflection preventing portion is a translucent tapered portion having an angle at which total reflection does not occur, for leading incident light in a direction opposite to the total reflection member side.

* * * * *